US012170052B2

(12) United States Patent
Hu et al.

(10) Patent No.: US 12,170,052 B2
(45) Date of Patent: Dec. 17, 2024

(54) DISPLAY PANEL AND DISPLAY DEVICE

(71) Applicant: Shanghai Tianma Microelectronics Co., Ltd., Shanghai (CN)

(72) Inventors: Yuqi Hu, Shanghai (CN); Jujian Fu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/099,564

(22) Filed: Jan. 20, 2023

(65) Prior Publication Data

US 2023/0230535 A1 Jul. 20, 2023

(30) Foreign Application Priority Data

Sep. 7, 2022 (CN) ........................ 202211090325.4

(51) Int. Cl.
*G09G 3/32* (2016.01)

(52) U.S. Cl.
CPC ....... *G09G 3/32* (2013.01); *G09G 2300/0842* (2013.01); *G09G 2310/0216* (2013.01); *G09G 2320/0247* (2013.01); *G09G 2330/021* (2013.01)

(58) Field of Classification Search
CPC ............. G09G 3/32; G09G 2300/0842; G09G 2310/0216; G09G 2320/0247; G09G 2330/021; G09G 3/3233; G09G 2300/0861; G09G 2300/0819; G09G 2320/0233; G09G 2320/045; G09G 2310/0251; G09G 2320/0214; G09G 2310/061; G09G 2320/043; G09G 2320/0257; G09G 2320/0626; G09G 2300/0452; G09G 2300/0871
See application file for complete search history.

(56) References Cited

U.S. PATENT DOCUMENTS

| | | | | |
|---|---|---|---|---|
| 11,004,385 | B1 * | 5/2021 | Li | G09G 3/3233 |
| 2014/0118409 | A1 * | 5/2014 | Jun | G09G 3/3233 345/690 |
| 2018/0061311 | A1 * | 3/2018 | Lin | G09G 3/32 |
| 2018/0261163 | A1 * | 9/2018 | Hyun | G09G 3/003 |
| 2021/0312868 | A1 * | 10/2021 | Kim | G09G 3/3266 |
| 2022/0335872 | A1 * | 10/2022 | Zhang | G09G 3/20 |
| 2022/0366847 | A1 * | 11/2022 | An | G09G 3/2003 |
| 2023/0088642 | A1 * | 3/2023 | Jin | G09G 3/3266 345/699 |

* cited by examiner

*Primary Examiner* — Matthew A Eason
*Assistant Examiner* — Sujit Shah
(74) *Attorney, Agent, or Firm* — KDW Firm PLLC

(57) ABSTRACT

Provided are a display panel and a display device. The display panel includes a pixel circuit and a light-emitting element. The pixel circuit includes a drive module and a first initialization module. The drive module is configured to generate a drive current. The first initialization module is configured to supply a first initialization voltage to a first node. The first node is connected to the light-emitting element. A first control terminal of the first initialization module is configured to transmit the first initialization voltage to the first node in response to a first scan control signal. A display period of the display panel includes a first display stage and a second display stage. In the first display stage, a total effective-pulse duration of the first scan control signal is T1. In the second display stage, the total effective-pulse duration of the first scan control signal is T2. T1<T2.

19 Claims, 12 Drawing Sheets

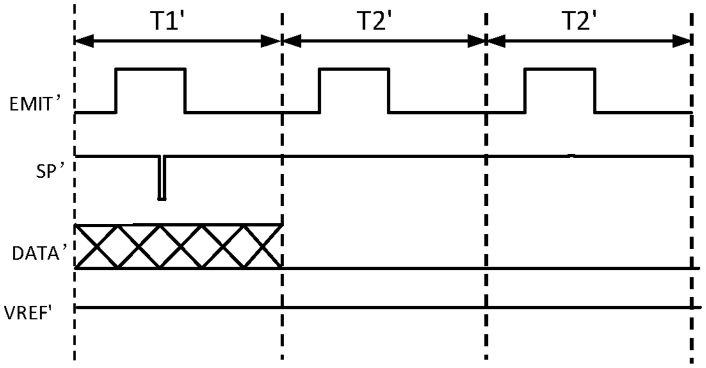
FIG. 1 -prior art-
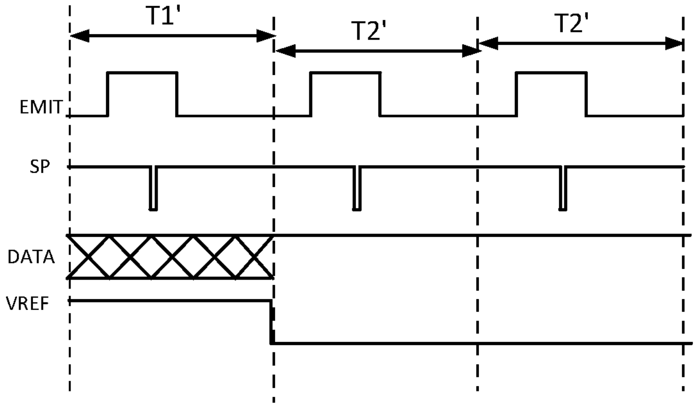
FIG. 2
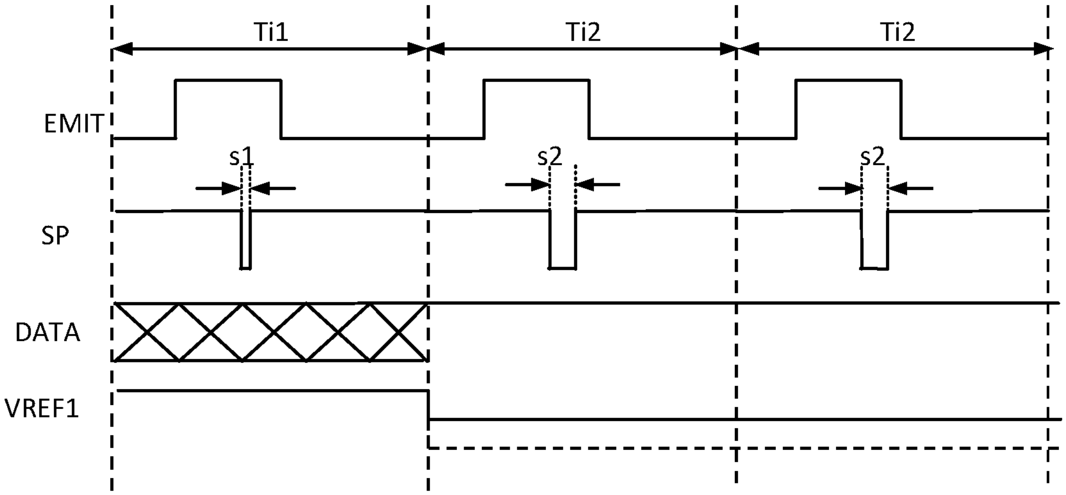
FIG. 3

DISPLAY PANEL AND DISPLAY DEVICE

CROSS-REFERENCE TO RELATED APPLICATION(S)

This application claims priority to Chinese Patent Application No. 202211090325.4 filed Sep. 7, 2022, the disclosure of which is incorporated herein by reference in its entirety.

TECHNICAL FIELD

The present disclosure relates to the field of display technologies and, in particular, to a display panel and a display device.

BACKGROUND

In the existing art, a panel or device with an electroluminescent element such as an organic light-emitting diode and a mini diode may be driven at different drive frequencies. That is, a display panel may display an image at different refresh rates. For the panel or device with an electroluminescent element, a pixel is driven by increasing a refresh rate when high-speed driving is required, and the pixel is driven by reducing the refresh rate when power consumption must be reduced or low-speed driving is required.

When the refresh rate of a data voltage is updated according to the changing refresh rate, the change of the refresh rate may be unnaturally perceived by a user. For example, when the refresh rate is switched from a high frequency to a low frequency, an increase in brightness-level may exist in a low-greyscale display, causing the change of the refresh rate to be obviously perceived by human eyes, affecting user experience, and reducing the effect of image display.

SUMMARY

Embodiments of the present disclosure provide a display panel and a display device.

Embodiments of the present disclosure provide a display panel. The display panel includes a pixel circuit and a light-emitting element. The pixel circuit is configured to drive the light-emitting element to emit light.

A pixel circuit includes a drive module and a first initialization module. The drive module is configured to generate a drive current. The first initialization module is configured to supply a first initialization voltage to a first node. The first node is connected to a light-emitting element. The first initialization module includes a first control terminal. The first control terminal is configured to transmit the first initialization voltage to the first node in response to a first scan control signal.

A display period of the display panel includes a first display stage and a second display stage. In the first display stage, a total effective-pulse duration of the first scan control signal is T1. In the second display stage, the total effective-pulse duration of the first scan control signal is T2. T1<T2.

Embodiments of the present disclosure provide a display device. The display device includes a display panel, wherein the display panel includes a pixel circuit and a light-emitting element. The pixel circuit is configured to drive the light-emitting element to emit light.

A pixel circuit includes a drive module and a first initialization module. The drive module is configured to generate a drive current. The first initialization module is configured to supply a first initialization voltage to a first node. The first node is connected to a light-emitting element. The first initialization module includes a first control terminal. The first control terminal is configured to transmit the first initialization voltage to the first node in response to a first scan control signal.

A display period of the display panel includes a first display stage and a second display stage. In the first display stage, a total effective-pulse duration of the first scan control signal is T1. In the second display stage, the total effective-pulse duration of the first scan control signal is T2. T1<T2.

BRIEF DESCRIPTION OF DRAWINGS

FIG. 1 is a drive timing diagram of a display panel in the existing art.

FIG. 2 is a drive timing diagram of a display panel according to an embodiment of the present disclosure.

FIG. 3 is another drive timing diagram of a display panel according to an embodiment of the present disclosure.

DETAILED DESCRIPTION

Figure 4:
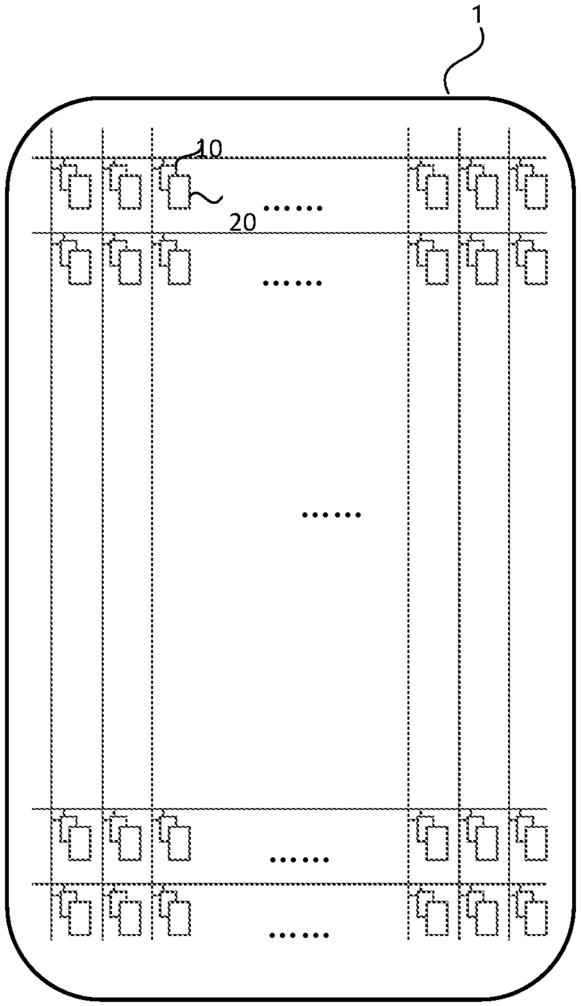
FIG. 4 is a schematic diagram of a display panel according to an embodiment of the present disclosure.

Hereinafter the present disclosure is further described in detail in conjunction with the drawings and embodiments. It is to be understood that the embodiments described herein are only intended to illustrate but not to limit the present disclosure. Additionally, it is to be noted that, for ease of description, only part, not all, of structures related to the present disclosure are illustrated in the drawings.

Multiple modulation manners generally exist when a refresh frequency of a display panel is switched. A modulation manner is that a frequency is reduced on the basis of a fundamental frequency. In general, the frequency may be reduced by integer multiples. When the frequency is reduced by integer multiples, the manner is referred to as frequency modulation through a frame insertion method. In the frame insertion method, a display period of the fundamental frequency includes an effective frame. Display frames after the frequency is reduced on the basis of the fundamental frequency include an effective frame and an ineffective frame. The duration of the effective frame and the duration of the ineffective frame are the same. In other words, an ineffective frame is inserted between adjacent effective frames to reduce a drive frequency. The number of ineffective frames inserted between adjacent effective frames is varied to vary a reduction multiple of the drive frequency. For example, the fundamental frequency is 120 HZ. When one ineffective frame is inserted, the frequency is reduced to 60 HZ. When two ineffective frames are inserted, the frequency is reduced to 40 HZ. The rest can be done in the same way. A switch between two drive frequencies may be a switch between the fundamental frequency and a frequency reduced from the fundamental frequency or a switch between two frequencies reduced from the same fundamental frequency. Another implementation is to vary the frame drive duration of a display frame of a fundamental frequency to achieve different fundamental frequencies. For example, a first fundamental frequency is 120 HZ, and a second fundamental frequency is 90 HZ. A frequency reduced from the first fundamental frequency may be 60 HZ, 40 HZ, or 30 HZ. A frequency reduced from the second fundamental frequency may be 45 HZ or 30 HZ. A switch between two drive frequencies may also be a switch between two fundamental frequencies or two frequencies reduced from two different fundamental frequencies respectively. It is to be noted that various embodiments of the present disclosure only aim at a switch between a fundamental frequency and a frequency reduced from the fundamental frequency.

As shown in FIG. 1, FIG. 1 is a drive timing diagram of a display panel in the existing art. FIG. 1 may illustrate the timing for a refresh frequency of the display panel being converted from a fundamental frequency of 120 HZ to 40 HZ. A display period includes one effective frame T1' and two ineffective frames T2'. However, when a high-frequency refresh rate is converted to a low-frequency refresh rate, in the effective frame, a pixel circuit of the display panel normally refreshes a data signal DATA' so that a light-emitting element can emit light according to the data signal DATA'. The ineffective frames T2' are used for maintaining the brightness-level corresponding to the effective frame T1'. Therefore, the ineffective frames T2' are equivalent to prolonging the light emission time on the basis of the effective frame T1'. When the light emission time increases, the brightness-level of the light-emitting element increases especially in a low greyscale. This is because a voltage of a control terminal of a drive module is slightly high. As the time increases, electric leakage occurs gradually, causing a reduction in the voltage of the control terminal of the drive module, thereby increasing the brightness-level of the low greyscale, and affecting a threshold offset of the drive module. In order to repair the brightness-level, an inventor found in the process of implementing the present disclosure that the brightness-level of the low greyscale can be lowered by lowering the brightness-level for resetting the light-emitting element or compensating a source of the drive module. In this case, the stability of brightness-level is maintained in the ineffective frames. The timing shown in FIG. 2 may be performed. FIG. 2 is a drive timing diagram of a display panel according to an embodiment of the present disclosure. In this embodiment, in an ineffective frame T2', brightness-level is maintained; additionally, an anode of the light-emitting element and a source of a drive transistor are reset through an SP signal. Therefore, an increase in the brightness-level of each light-emitting element during the ineffective frame is suppressed. Moreover, an absolute value of an anode reset signal VREF of the light-emitting element may also be increased, thereby suppressing the problem of an increase in the brightness-level of the ineffective frame and avoiding a positive voltage drop at both ends of the light-emitting element during the ineffective frame. Accordingly, the problem of an insufficient black state of the display panel is avoided. When the absolute value of the anode reset signal VREF is relatively large, light-emitting elements in different colors have different brightness-level suppression effects due to different materials, resulting in a relatively great offset in the ratio of different colors of light of the display panel. The display panel has a relatively serious color cast especially in a low greyscale state, affecting visual effect. In order to alleviate the problem of a color cast, this embodiment creatively proposes prolonging the reset time of the light-emitting element in the ineffective frame to reduce the absolute value of the anode reset signal VREF required for a reset. In this case, the brightness-level of the light-emitting element is controlled within a reasonable range, stabilizing the ratio of light of different colors of the display panel and thus avoiding display defects such as a color cast.

Figure 5:
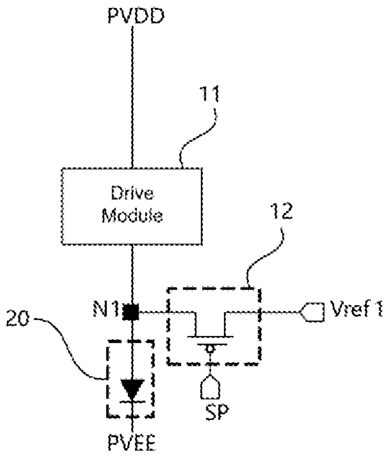
FIG. 5 is a schematic diagram of a pixel circuit according to an embodiment of the present disclosure.

FIG. 3 is another drive timing diagram of a display panel according to an embodiment of the present disclosure. FIG. 4 is a schematic diagram of a display panel according to an embodiment of the present disclosure. FIG. 5 is a schematic diagram of at least one pixel circuit according to an embodiment of the present disclosure. Embodiments of the present disclosure provide a display panel 1. The display panel 1 includes at least one pixel circuit 10 and at least one light-emitting element 20. The at least one pixel circuit 10 is configured to drive the at least one light-emitting element 20 to emit light.

Each of the at least one pixel circuit 10 includes a drive module 11 and a first initialization module 12. The drive module 11 is configured to generate a drive current. The first initialization module 12 is configured to supply a first initialization voltage to a first node N1. The first node N1 is connected to a respective one of the at least one light-emitting element 20. The first initialization module 12 includes a first control terminal. The first control terminal is configured to transmit the first initialization voltage VREF1 to the first node N1 in response to a first scan control signal SP.

A display period of the display panel 1 includes a first display stage Ti1 and at least one second display stage Ti2. In the first display stage Ti1, a total effective-pulse duration of the first scan control signal is T1. In the second display stage Ti2, the total effective-pulse duration of the first scan control signal is T2. T1<T2.

The display panel 1 generally includes sub-pixels arranged in an array. In an example, the sub-pixels may be arranged in rows and columns to form a rectangular array. In another example, the sub-pixels may also be arranged in other regular or irregular forms, which is not limited in the embodiments of the present disclosure. Each sub-pixel is provided with a pixel circuit 10 and a light-emitting element 20. The pixel circuit 10 may drive the light-emitting element 20 to emit light. The pixel circuit 10 may include a drive module 11 and a first initialization module 12. The drive module 11 may be electrically connected to the light-emitting element 20 to supply a drive current to the light-emitting element 20. In an example, as shown in FIG. 4, a first terminal of the drive module 11 may be connected to a first power signal PVDD. A second terminal of the drive module 11 may be connected to an anode of the light-emitting element 20. A cathode of the light-emitting element 20 is connected to a second power signal PVEE. In this case, the first power signal PVDD, the light-emitting element 20, and the second power signal PVEE can form a closed circuit through the drive module 11, so that the drive module 11 can generate the drive current for the light-emitting element 20. The first initialization module 12 can transmit the first initialization voltage VREF1 to the first node N1 in response to the first scan control signal SP. In this embodiment, the first node N1 is connected to one of the anode of the light-emitting element 20 or the cathode of the light-emitting element 20 to perform reset for the light-emitting element 20. When the first node N1 is connected to the anode of the light-emitting element 20, the first initialization voltage VREF1 is negative. When the first node N1 is connected to the cathode of the light-emitting element 20, the first initialization voltage VREF1 is positive. An example in which the first node N1 is connected to the anode of the light-emitting element 20 is taken for describing this embodiment.

Figure 6:
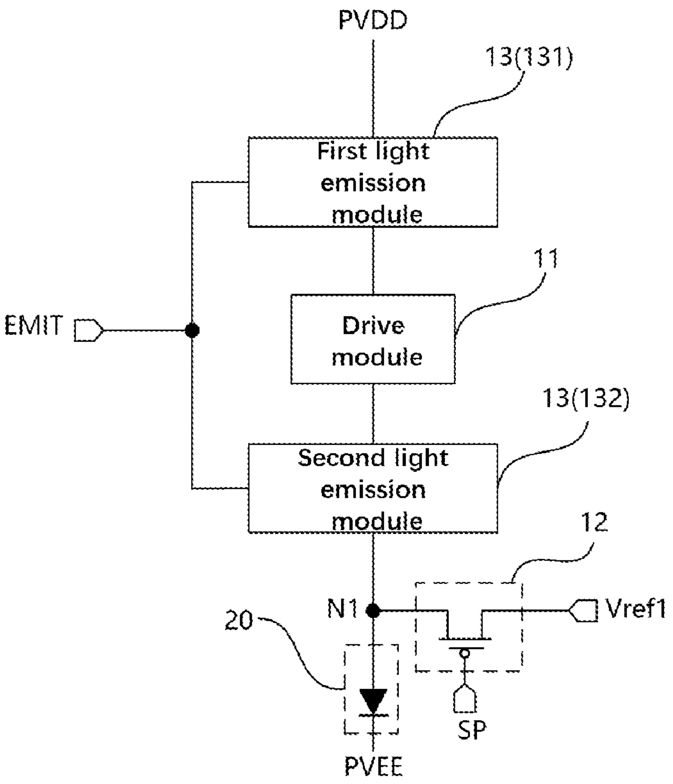
FIG. 6 is another schematic diagram of a pixel circuit according to an embodiment of the present disclosure.

In some embodiments, FIG. 6 is another schematic diagram of a pixel circuit according to an embodiment of the present disclosure. As shown, the display panel may also include a light emission control module 13. The light emission control module 13 is configured to control the drive current to be transmitted to the light-emitting element 20 in response to a light emission control signal so that the first power signal PVDD, the drive module 11, the light-emitting element 20, and the second power signal PVEE form a closed circuit. In the first display stage Ti1 and the second display stage Ti2, the period of an effective pulse of the first scan control signal SP is located within the period of an ineffective pulse of the light emission control signal.

In this embodiment, the light emission control module 13 may, in response to the light emission control signal, control the drive module 11 to communicate with the light-emitting element 20. In some embodiments, the light emission control module 13 may include a first light emission control module 131 and a second light emission control module 132. The first light emission control module 131 may, in response to a first light emission control signal EMIT1, turn on the first power signal PVDD and the drive module 11. The second light emission control module 132 may, in response to a second light emission control signal EMIT2, turn on the drive module 11 and the light-emitting element 20. In some embodiments, the preceding first light emission control signal EMIT1 and the preceding second light emission control signal EMIT2 may be the same signal. In this case, as shown in FIG. 6, the first light emission control module 131 and the second light emission control signal EMIT2 may respond to the light emission control signal EMIT simultaneously. It is to be noted that each of the first display stage Ti1 or the second display stage Ti2 needs to be provided with at least one ineffective pulse of the light emission control signal EMIT to prevent the at least one light-emitting element 20 from emitting light continuously and reducing a brightness-level offset. It is to be noted that whether in the first display stage Ti1 or the second display stage Ti2, the period of the effective pulse of the first scan control signal SP is located within the period of the ineffective pulse of the light emission control signal; that is, the reset of the at least one light-emitting element 20 should be in a period in which the at least one light-emitting element 20 does not emit light.

A display period of the display panel is a period between the start of refreshing the current image and the start of refreshing the next image, that is, a period between the start of an effective frame of the current image and the start of an effective frame of the next image. The display period may include the first display stage Ti1 and the second display stage Ti2. When a refresh frequency is changed by using a frame insertion method, in this embodiment, the first display stage Ti1 may be an effective frame, and the second display stage Ti2 may be an ineffective frame. In the effective frame, the first initialization voltage is V1, and the total effective-pulse duration of the first scan control signal SP is T1. It is to be noted that the total effective-pulse duration of the first scan control signal SP is the total duration when the first scan control signal SP is an effective level in the effective frame. That is, when the first scan control signal SP is provided with only one effective pulse in the effective frame, T1 is the width of the effective pulse; when the first scan control signal SP is provided with only a plurality of effective pulses in the effective frame, T1 is the total duration of the effective pulses. In general, the effective frame is provided with only one effective pulse of the first scan control signal SP. Similarly, in the ineffective frame, the first initialization voltage is V2, and the total effective-pulse duration of the first scan control signal SP is T2. Similarly, when the first scan control signal SP is provided with only one effective pulse in the ineffective frame, T1 is the width of the effective pulse; when the first scan control signal SP is provided with only a plurality of effective pulses in the ineffective frame, T1 is the total duration of the effective pulses. The number of pulses of the first scan control signal SP in the ineffective frame is not limited in this embodiment as long as it guarantees that T1<T2. That is, a reset duration of the at least one light-emitting element in the ineffective frame is increased so that the brightness-level change of a sub-pixel in each color is controlled within the reasonable range, guaranteeing that the color does not deviate greatly and improving display effect.

In embodiments of the present disclosure, each pixel circuit includes a drive module and a first initialization module. The drive module is configured to generate a drive current to drive a light-emitting element. The first initialization module is configured to transmit a first initialization voltage to a first node in response to a first scan control signal. The first node is connected to a light-emitting element. A display period of the display panel includes a first display stage and at least one second display stage. The first display stage and the second display stage are each provided with an effective pulse of the first scan control signal, resetting the first node and avoiding the problem of an increase in the brightness-level of a low greyscale. Moreover, the total effective-pulse duration of the first scan control signal in the second display stage is greater than the total effective-pulse duration of the first scan control signal in the first display stage so that the brightness-level change of a sub-pixel in each color is controlled within the reasonable range, guaranteeing that the color does not deviate greatly and improving display effect.

The technical solutions in embodiments of the present disclosure are described clearly and completely hereinafter in conjunction with the drawings in embodiments of the present disclosure.

In some embodiments, in the first display stage Ti1, the first initialization voltage is V1. In the second display stage Ti2, the first initialization voltage is V2. $|V1|<|V2|$. An absolute value of an anode reset signal VREF of the light-emitting element may be increased, further suppressing the problem of an increase in the brightness-level of the ineffective frame.

When the anode of the light-emitting element is reset, the first initialization voltage is negative, and V1>V2. When the cathode of the light-emitting element is reset, the first initialization voltage is positive, and V1<V2. An example is taken in which the anode of the light-emitting element is reset. In the first display stage Ti1 (effective frame), anode reset voltage V1 is generally the same as the second power signal PVEE of the cathode of the light-emitting element 20, avoiding the problem that the black state is not black enough due to a positive voltage drop between the anode and the cathode when the light-emitting element 20 is reset. In the second display stage Ti2 (ineffective frame), anode reset voltage V2 cannot be greater than anode reset voltage V1, further avoiding the case where the anode is not completely reset. In general, $|V1|<|V2|$. In this way, the case where the black state of the display panel is not black enough is effectively avoided, improving the effect of resetting the anode of the light-emitting element 20.

It is to be noted that referring to FIG. 3, the value of a dotted part of the first initialization voltage VREF1 in FIG. 3 is the value of an initialization voltage VREF in FIG. 2. Compared with the solution shown in FIG. 2, an absolute value of the value V2 of the first initialization voltage in this embodiment is effectively reduced. The first initialization voltage with a relatively small absolute value makes the ratio of sub-pixels in each color relatively stable, effectively avoiding the problem of a color cast caused by the first initialization voltage.

In some embodiments, with continued reference to FIG. 3, the first display stage Ti1 and the second display stage Ti2 each include one effective pulse of the first scan control signal SP. The width s2 of an effective pulse of the first scan control signal SP in the second display stage Ti2 is greater than the width s1 of an effective pulse of the first scan control signal SP in the first display stage Ti1. In this embodiment, each display stage (the first display stage Ti1 and the second display stage Ti2) may be provided with only one effective pulse of the first scan control signal SP. In order to increase the reset duration of the at least one light-emitting element in the ineffective frame, it is necessary to increase the width s2 of the effective pulse of the first scan control signal SP in the ineffective frame; that is, s1<s2. In this case, the absolute value of the value V2 of the first initialization voltage in the ineffective frame is reduced effectively, effectively preventing the brightness-level change of a sub-pixel in each color from exceeding the reasonable range and thus avoiding the problem of a display color cast.

Figure 7:
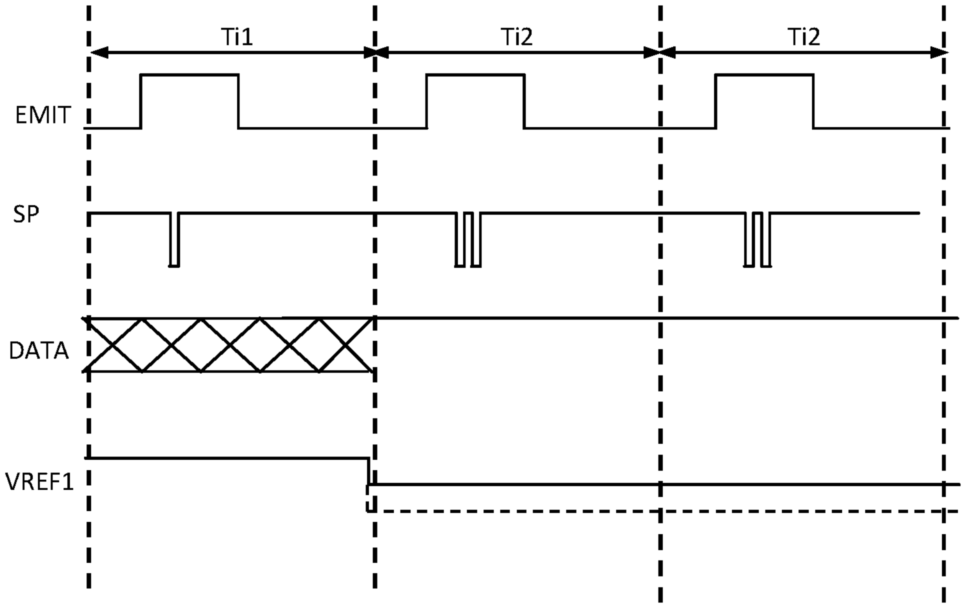
FIG. 7 is another drive timing diagram of a display panel according to an embodiment of the present disclosure.

FIG. 7 is another drive timing diagram of a display panel according to an embodiment of the present disclosure. In some embodiments, the second display stage Ti2 may include at least two effective pulses of the first scan control signal SP. In the first display stage Ti1, only one effective pulse of the first scan control signal SP is provided in general. In the second display stage Ti2, a plurality of effective pulses of the first scan control signal SP may be provided. In this case, the effective-pulse duration T2 of the first scan control signal SP in the second display stage Ti2 is greater than the effective-pulse duration T1 of the first scan control signal SP in the first display stage Ti1. Accordingly, the absolute value of the value V2 of the first initialization voltage is reduced effectively, keeping the ratio of sub-pixels in each color stable and effectively avoiding the problem of a color cast. For example, the width of each effective pulse of the first scan control signal SP may be the same in the first display stage Ti1 and the second display stage Ti2. The increasement of the total effective-pulse duration of the first scan control signal SP in the second display stage Ti2 may be implemented by adding additional effective pulses of the first scan control signal SP.

Figure 8:
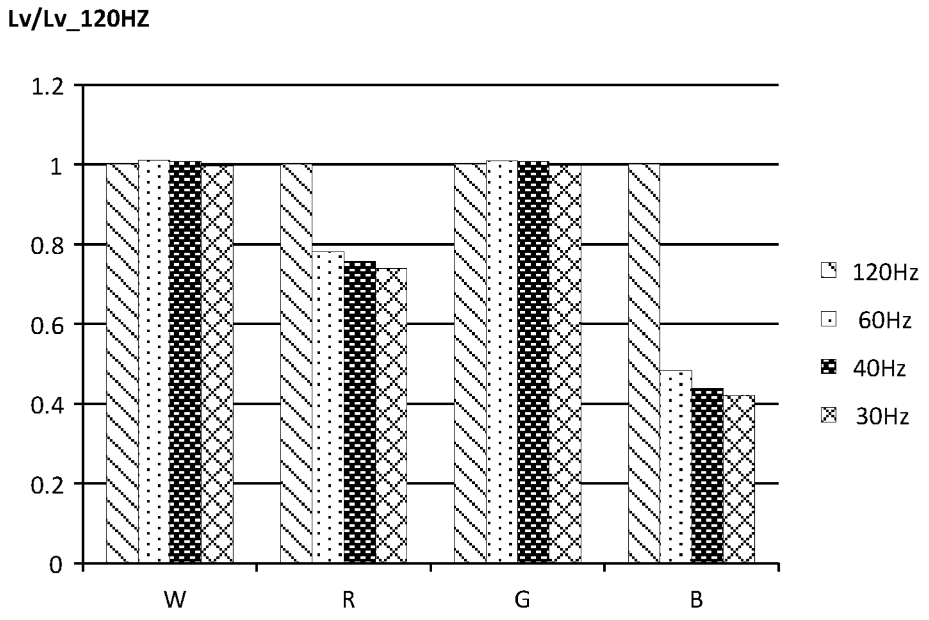
FIG. 8 is a cylindrical diagram illustrating the display brightness-level of the drive timing of the display panel in FIG. 2.
Figure 9:
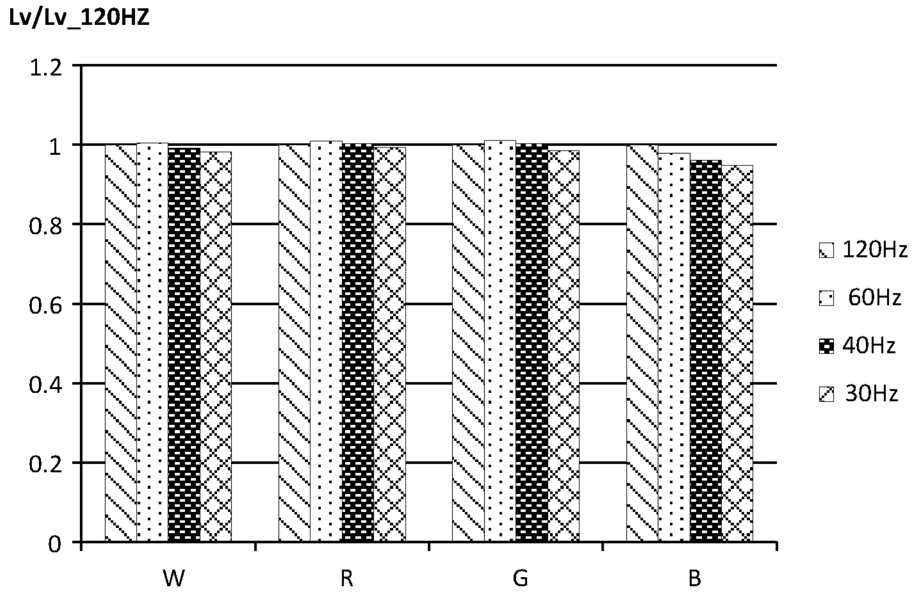
FIG. 9 is a cylindrical diagram illustrating the display brightness-level of the drive timing of the display panel in FIG. 7.
Figure 10:
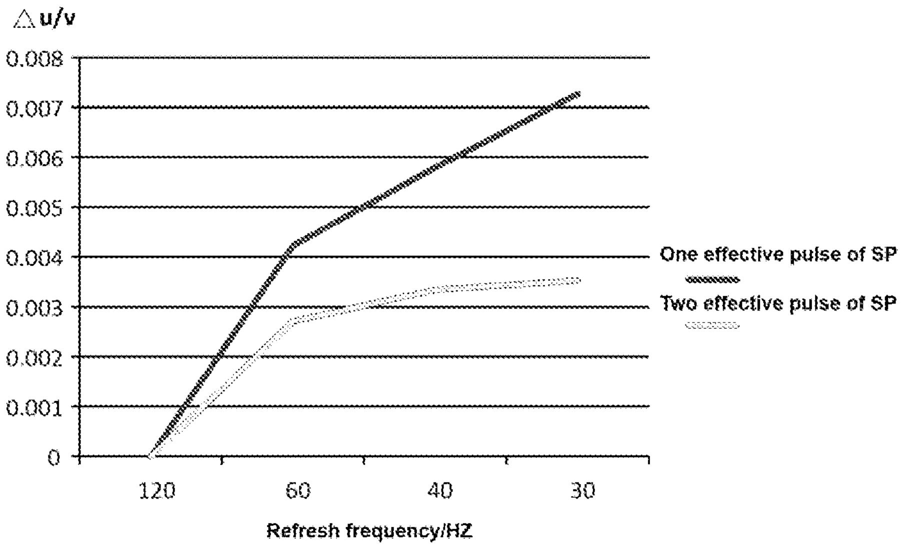
FIG. 10 is a broken line diagram illustrating the display brightness-level of a display panel according to an embodiment of the present disclosure.

In an example, the width of each effective pulse of the first scan control signal SP is set to be the same. As shown in FIG. 2, one effective pulse of the first scan control signal SP is set in the ineffective frame. As shown in FIG. 7, two effective pulses of the first scan control signal SP are set in the second display stage Ti2 (ineffective frame). As shown in FIGS. 8 and 9, FIG. 8 is a cylindrical diagram illustrating the display brightness-level of the drive timing of the display panel in FIG. 2, and FIG. 9 is a cylindrical diagram illustrating the display brightness-level of the drive timing of the display panel in FIG. 7. Abscissas of the preceding cylindrical diagrams represent sub-pixels in different colors, for example, including a white sub-pixel W, a red sub-pixel R, a green sub-pixel G, and a blue sub-pixel B. An ordinate represents a ratio of the display brightness-level Lv at a current frequency (lower than 120 Hz) to the display brightness-level Lv12hHz at a fundamental frequency of 120 Hz. For a sub-pixel in each color, brightness-level changes of 120 Hz, 60 Hz, 40 Hz, and 30 Hz are recorded. As shown in FIG. 8, in the case where one effective pulse of the SP is set in the ineffective frame, the brightness-level of the red sub-pixel R and the brightness-level of the blue sub-pixel B reduce obviously when the refresh frequency reduces gradually, easily causing an offset in the ratio of colors of various sub-pixels. As shown in FIG. 9, when two effective pulses of the SP are set in the second display stage Ti2, the sub-pixels in various colors have little difference in brightness-level when the refresh frequency changes. In order to acquire the changing trend of the preceding display brightness-level more intuitively, reference may be made to FIG. 10. FIG. 10 is a broken line diagram illustrating the display brightness-level of a display panel according to an embodiment of the present disclosure. In FIG. 10, an abscissa is a refresh rate, and an ordinate is a ratio of a difference Au between the display brightness-level at the current refresh frequency and the display brightness-level at 120 Hz and the display brightness-level v at 120 Hz. As shown in FIG. 10, when one effective pulse of the SP is set in the ineffective frame, the display brightness-level of the display panel changes greatly with the change of the refresh frequency. When two effective pulses of the SP are set in the ineffective frame, in a switch of the refresh frequency, the display brightness-level of the display panel has little difference and is located in a relatively stable range, obviously alleviating the problem of a frequency-switching flicker due to the change of the display brightness-level and effectively avoiding the generation of a color cast.

In some embodiments, the display period of the display panel may include a first display stage Ti1 and at least one second display stage Ti2. The total effective-pulse duration of the first scan control signal SP in each second display stage Ti2 is the same. In this embodiment, the first display stage Ti1 may be an effective frame, and a second display stage Ti2 may be an ineffective frame. The display period includes one first display stage Ti1 and at least one second display stage Ti2. For example, in the case where a fundamental frequency is 120 Hz, the refresh frequency of the display panel would be 60 Hz when the display period includes one first display stage Ti1 and one second display stage Ti2, the refresh frequency of the display panel would be 40 Hz when the display period includes one first display stage Ti1 and two second display stages Ti2, and same alike. This embodiment limits that the first scan control signal SP in each second display stage Ti2 have the same effective-pulse duration. In this case, the anode of the light-emitting element in each second display stage Ti2 has the same reset duration, and the first initialization voltage also has the same value V2. A relatively small |V2| guarantees that the brightness-level change of a sub-pixel in each color is within the reasonable range, avoiding the problem of a color cast.

Figure 11:
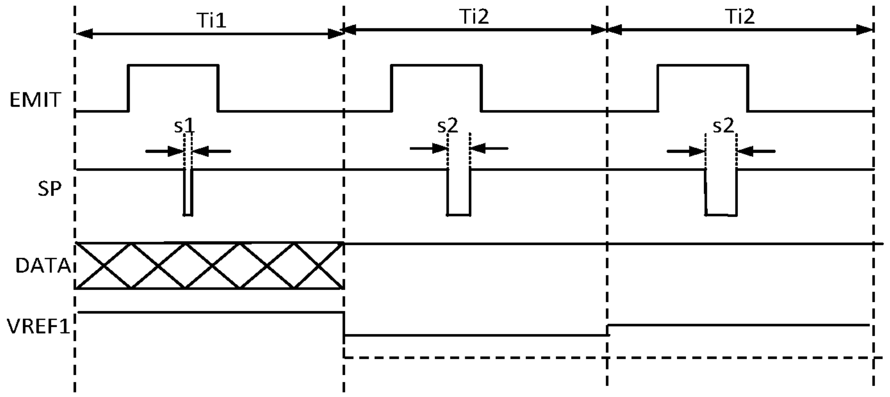
FIG. 11 is another drive timing diagram of a display panel according to an embodiment of the present disclosure.
Figure 12:
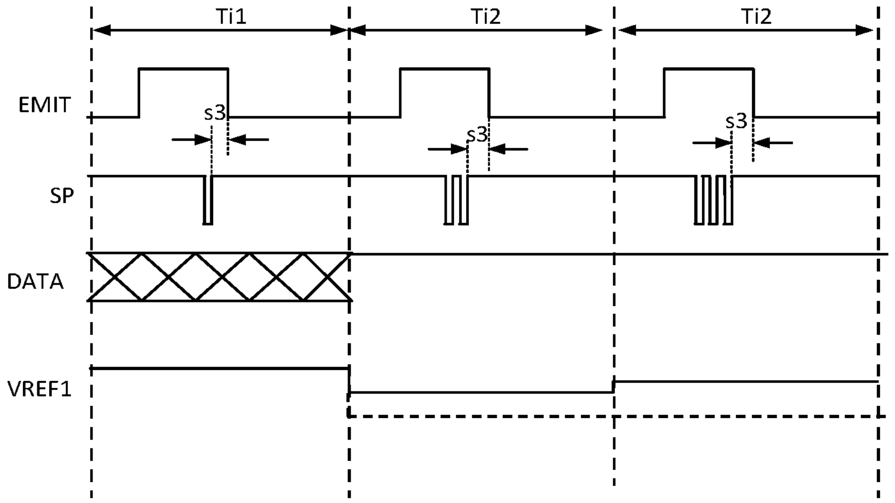
FIG. 12 is another drive timing diagram of a display panel according to an embodiment of the present disclosure.

FIG. 11 is another drive timing diagram of a display panel according to an embodiment of the present disclosure. FIG. 12 is another drive timing diagram of a display panel according to an embodiment of the present disclosure. In some embodiments, the display period of the display panel may include a first display stage Ti1 and a plurality of second display stages Ti2. Total effective-pulse durations of the first scan control signal in at least two second display stages Ti2 are different. When the display period includes a plurality of second display stages Ti2, total effective-pulse durations of the first scan control signal SP in different second display stages Ti2 are different. In an example, as shown in FIG. 11, the pulse width s2 of the first scan control signal SP in the first second display stage Ti2 close to the first display stage Ti1 is less than the pulse width s2 of the first scan control signal SP of the second display stage Ti2 so that total effective-pulse durations T2 of the first scan control signal SP in different second display stages Ti2 are different from each other. In another example, as shown in FIG. 12, two effective pulses of the first scan control signal SP may be provided in the first second display stage Ti2 close to the first display stage Ti1, and three effective pulses of the first scan control signal SP may be provided in the second display stage Ti2. In this case, total durations T2 of effective frames of the first scan control signal SP in different second display stages Ti2 are different from each other. Correspondingly, the absolute value of the value V2 of the first initialization voltage in a second display stage Ti2 in which the total effective-pulse duration T2 of the first scan control signal SP is relatively long is smaller, further helping alleviate the problem of a display color cast.

With continued reference to FIGS. 11 and 12, in some embodiments, in the i-th second display stage Ti2, the first initialization voltage is V21, and the total effective-pulse duration of the first scan control signal is T21. In the (i+1)-th second display stage Ti2, the first initialization voltage is V22, and the total effective-pulse duration of the first scan control signal is T22. |V21|>|V22|. T21<T22. 1≤i≤N−1. i is an integer. N is the total number of second display stages.

The first second display stage Ti2 may be adjacent to the first display stage Ti1. In this embodiment, from the first second display stage Ti2 to the last second display stage Ti2, the total effective-pulse duration of the first scan control signal SP in each second display stage Ti2 increases gradually. Correspondingly, absolute values of values V2 of the first initialization voltage reduce gradually. in the case where the total number of second display stages Ti2 is N, when the total effective-pulse duration of the first scan control signal SP in the i-th second display stage Ti2 is T21 and the total effective-pulse duration of the first scan control signal in the (i+1)-th second display stage Ti2 is T22, T21<T22; correspondingly, when the first initialization voltage in the i-th second display stage Ti2 is V21 and the first initialization voltage in the (i+1)-th second display stage Ti2 is V22, |V21|>|V22|. In this case, the brightness-level of a sub-pixel in each color in the (i+1)-th second display stage Ti2 is more stable than that the brightness-level of a sub-pixel in each color in the i-th second display stage Ti2 to gradually alleviate the problem of a color cast, effectively avoiding the problem of a color cast in a low greyscale.

In some embodiments, with continued reference to FIG. 3, the first initialization voltage VREF1 may also serve as the second power signal PVEE. In general, the second power signal PVEE is a fixed negative voltage. In this embodiment, the first initialization voltage VREF1 is a variable signal as the first initialization voltage VREF1 have different values in the first display stage Ti1 and a second display stage Ti2. In this embodiment, the first initialization voltage VREF1 may also serve as the second power signal PVEE because the value of the first initialization voltage is V1 and V2 in the effective frame and in the ineffective frame respectively. In general, |V1|<|V2|, preventing the light-emitting element 20 from generating a positive voltage drop when the anode is reset. When the first initialization voltage VREF1 also serves as the second power signal PVEE, the voltage drop between the anode of the light-emitting element 20 and the cathode of the light-emitting element 20 is zero when the anode is reset. In this case, no positive voltage drop exists, improving the reliability of an anode reset. Moreover, when the first initialization voltage VREF1 also serves as the second power signal PVEE, the arrangement of one power signal is reduced, simplifying the design of the pixel circuit and reducing the power consumption of the display panel.

As shown in FIG. 12, in some embodiments, in each of the first display stage Ti1 and the second display stage Ti2, a preset delay s3 is set between an end time of a last effective pulse of the first scan control signal SP and an end time of an ineffective pulse of a corresponding light emission control signal EMIT. According to the preceding embodiments, the period of an effective pulse of the first scan control signal SP is located within the period of an ineffective pulse of the light emission control signal EMIT. Since a plurality of effective pulses of the first scan control signal SP may exist in the second display stage Ti2, the preceding effective pulses of the first scan control signal SP also need to be located within the period of an ineffective pulse of the light emission control signal EMIT. Moreover, the preset delay s3 is set between the end time of the last effective pulse of the first scan control signal SP and the end time of the ineffective pulse of the corresponding light emission control signal EMIT. The light-emitting element can emit light normally after a period of time from the reset of the light-emitting element, enhancing the reset effect of the light-emitting element, effectively restraining the brightness-level increase of the light-emitting element in a low greyscale, and alleviating the problem of a color cast when a sub-pixel in each color is in a frequency switch, especially in a low-greyscale frequency switch.

With continued reference to FIG. 12, in some embodiments, a duration of a preset delay s3 in the first display stage Ti1 is shorter than a duration of a preset delay s3 in the second display stage Ti2. The brightness-level of the display panel may increase with an increase of the light emission time. The second display stage Ti2 is located after the first display stage Ti1. Accordingly, the brightness-level of the second display stage Ti2 is easier to increase. In this embodiment, the preset delay existing between the light emission time of the light-emitting element and the reset time in the second display stage Ti2 may be controlled to be different from the preset delay existing between the light emission time of the light-emitting element and the reset time in the first display stage Ti1. The duration of the preset delay s3 in the second display stage Ti2 is controlled to be greater than the duration of the preset delay s3 in the first display stage Ti1, enhancing the reset effect of the anode of the light-emitting element in the second display stage Ti2, effectively preventing the display brightness-level from increasing, maintaining the brightness-level stability of the light-emitting element in a low greyscale, and alleviating the problem of a color cast when a sub-pixel in each color is in a frequency switch.

Figure 13:
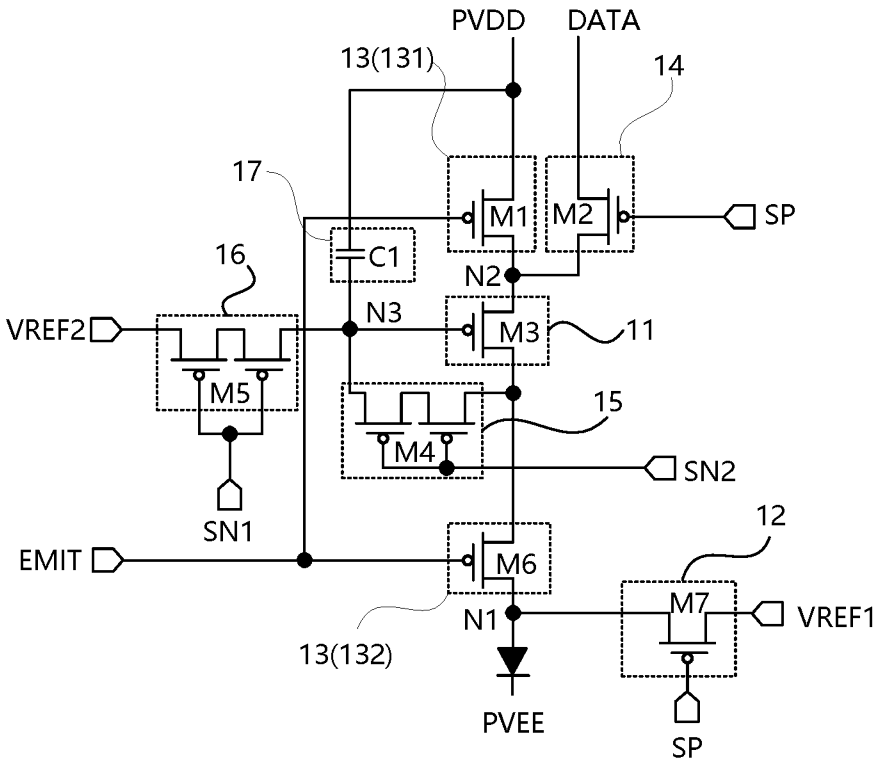
FIG. 13 is another schematic diagram of a pixel circuit according to an embodiment of the present disclosure.

FIG. 13 is another schematic diagram of a pixel circuit according to an embodiment of the present disclosure. In some embodiments, the display panel may further include a data write module 14 and a threshold compensation module 15. The data write module 14 is configured to supply a data signal to a first terminal of the drive module 11. The threshold compensation module 15 is connected to a control terminal of the drive module 11 and a second terminal of the drive module 11. The data signal in the first display stage is D1. The data signal in the second display stage is D2. $|D1|<|D2|$.

In this embodiment, the pixel circuit further includes the data write module 14 and the threshold compensation module 15. In the first display stage Ti1, the data write module 14 writes the data signal into the first terminal of the drive module 11 first. Then the data signal can be written into the control terminal of the drive module 11 through the threshold compensation module 15. In the second display stage Ti2, the data write module 14 only writes the data signal into the first terminal of the drive module 11, while the threshold compensation module 15 is turned off. Accordingly, the data signal is controlled to reset the drive module 11, that is, to reset the second node N2. The data signal in the first display stage is D1. The data signal in the second display stage is D2. In this embodiment, $|D1|<|D2|$. Accordingly, the difference between the biasing state of the drive module 11 in the second display stage Ti2 and the biasing state of the drive module 11 in the first display stage Ti1 is reduced, reducing the displayed brightness-level at a low refresh rate and especially the displayed brightness-level of a low greyscale. In the first display stage Ti1, the data signal D1 is a voltage signal that is variable according to the display screen. The data signal D2 may be a constant voltage. In this case, when the display panel is in the second display stage Ti2, the driver chip supplies a constant voltage to the data write module 14, simplifying a working module of the driver chip. Of course, in this embodiment, the data signal D2 may also be a variable voltage signal as long as it is satisfied that the data signal D2 is greater than the data signal D1.

As shown in Table 1, Table 1 is a table of corresponding displayed brightness-level changes of the display panel. Table 1 shows a change amount u % of the display brightness-level of the display panel when the refresh frequency of 120 Hz is reduced to a set frequency. Variables in the Table 1 are the reset voltage of the first node N1 and the reset voltage of the second node N2, that is, the first initialization voltage V2 and the data signal D2. It can be seen that as the absolute value of the data signal D2 and the absolute value of the first initialization voltage V2 increase, the brightness-level change amount of the display panel in a frequency-switching process decreases gradually. In the embodiment, data signals are controlled to satisfy that $|D1|<|D2|$, effectively restraining the ineffective frame. That is, the brightness-level of the display panel rises in the second display stage Ti2, improving display effect.

TABLE 1

A table of corresponding displayed brightness-level changes of the display panel

| | V2 | | | | | | | |
|---|---|---|---|---|---|---|---|---|
| D2 | −1.8 | −1.9 | −2 | −2.1 | −2.2 | −2.3 | −2.4 | −2.5 |
| 5 | 10.75 | 10.41 | 9.98 | 9.73 | 9.24 | 8.82 | 8.37 | 8.04 |
| 5.2 | 10.48 | 10.21 | 9.81 | 9.37 | 8.87 | 8.54 | 7.86 | 7.53 |
| 5.4 | 9.99 | 9.79 | 9.29 | 8.91 | 8.44 | 8.14 | 7.67 | 7.29 |
| 5.6 | 9.54 | 9.07 | 8.82 | 8.26 | 7.99 | 7.54 | 6.95 | 6.45 |
| 5.8 | 8.78 | 8.27 | 8.08 | 7.58 | 7.07 | 6.75 | 6.25 | 5.78 |
| 6 | 8.49 | 7.84 | 7.56 | 6.97 | 6.54 | 6.18 | 5.68 | 5.23 |
| 6.2 | 7.79 | 7.19 | 6.89 | 6.49 | 6.07 | 5.82 | 5.18 | 4.6 |
| 6.4 | 7.5 | 6.91 | 6.53 | 6.18 | 5.88 | 5.28 | 4.86 | 4.31 |
| 6.6 | 7.15 | 6.82 | 6.48 | 6.06 | 5.38 | 5.07 | 4.58 | 4.06 |
| 6.8 | 7.14 | 6.51 | 6.05 | 5.48 | 5.11 | 4.84 | 4.14 | 3.82 |

With continued reference to FIG. 13, in some embodiments, the control terminal of the data write module 14 is configured to receive the first scan control signal SP. In the first display stage Ti1 and the second display stage Ti2, the first scan control signal SP is used to control the data write module 14 and the first initialization module 12 to be turned on simultaneously. In this embodiment, the first node N1 and the second node N2 may be reset simultaneously. The reset of the first node N1 enhances the reset degree of the light-emitting element and the reset of the second node N2 maintains the biasing state of the drive module 11, both of which can reduce the display brightness-level of the display panel at a low refresh rate. In this case, in this embodiment, the data write module 14 and the first initialization module 12 may be controlled simultaneously through the first scan control signal SP so that the first node N1 and the second node N2 can start and end their reset processes simultaneously, effectively saving the number of scan control signals and improving the convenience of a reset control.

Figure 14:
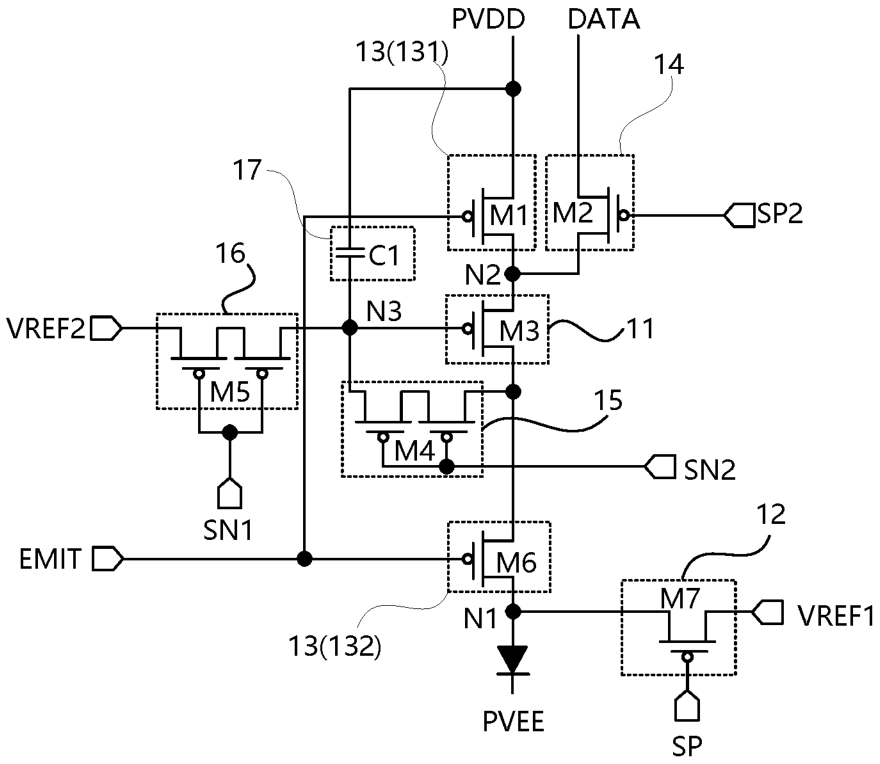
FIG. 14 is another schematic diagram of a pixel circuit according to an embodiment of the present disclosure.
Figure 15:
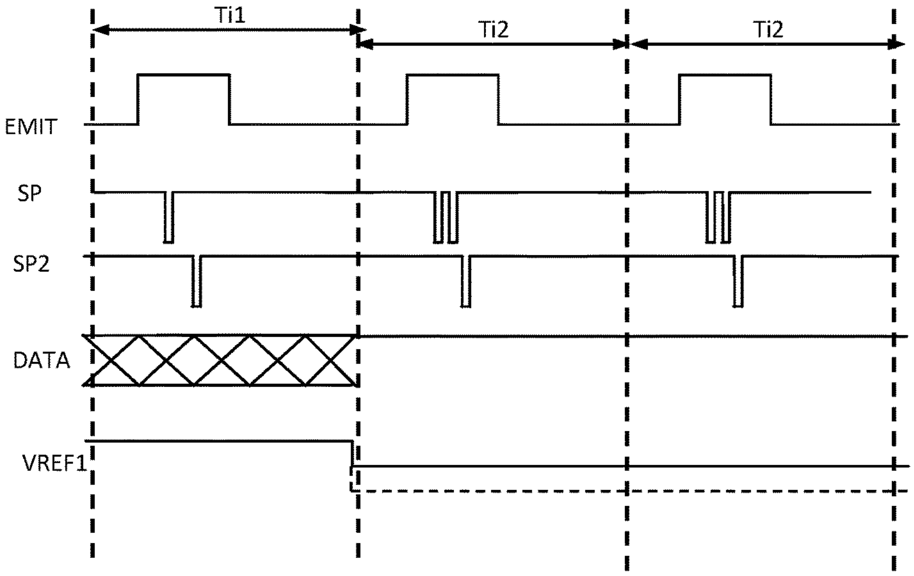
FIG. 15 is another drive timing diagram of a display panel according to an embodiment of the present disclosure.

FIG. 14 is another schematic diagram of a pixel circuit according to an embodiment of the present disclosure. FIG. 15 is another drive timing diagram of a display panel according to an embodiment of the present disclosure. In some embodiments, the control terminal of the data write module 14 is configured to receive a second scan control signal SP2. In the first display stage Ti1 and the second display stage Ti2, the second scan control signal SP2 is configured to control the data write module 14 to be turned on. The first scan control signal SP is used to control the first initialization module 12 to be turned on. In the second display stage Ti2, the total effective-pulse duration T3 of the first scan control signal SP is longer than a total effective-pulse duration T4 of the second scan control signal SP2.

In this embodiment, the first initialization module 12 and the data write module 14 may be not turned on simultaneously. That is, the first node N1 and the second node N2 are not reset simultaneously. It is to be noted that when the second node N2 needs to be reset, voltages at two ends of the first light emission control module 131 are the first power signal PVDD and the data signal D2. when the data signal D2 is greater than the first power signal PVDD, a current flowing from the second node N2 to the first power signal PVDD may exist. Since an expected current flows from the first power signal PVDD to the second node N2, the generation of the preceding reverse current easily causes a waste of power consumption. As a result, the reset time of the second node N2 may be relatively short. In this embodiment, the writing of the data signal D2 may be controlled through the second scan control signal SP2 alone. To further avoid the problem of a color cast and effectively stabilize a range of the display brightness-level of a sub-pixel in each color, a reset duration of the first node N1 controlled by the first scan control signal SP needs to be relatively long. In this embodiment, the first node N1 and the second node N2 may be reset separately. Moreover, the total effective-pulse duration of the first scan control signal SP is T3. The total effective-pulse duration of the second scan control signal SP2 is T4. T3>T4. In this case, the light-emitting element can be reset effectively, avoiding the problem of a color cast; moreover, the power consumption can be reduced effectively, improving the working efficiency of the display panel.

In some embodiments, the at least one light-emitting element may include at least a first color light-emitting element and a second color light-emitting element. In the second display stage Ti2, a first initialization voltage of a respective one of the at least one pixel circuit corresponding to the first color light-emitting element is different from a first initialization voltage of a respective one of the at least one pixel circuit corresponding to the second color light-emitting element. As shown in FIGS. 8 and 9, when the light-emitting elements in different colors emit light, the same first initialization voltage VREF1 has different effects on the brightness-level of the light-emitting elements in different colors. The light-emitting elements in different colors are made from different Light emission materials. Light emission efficiencies of different light emission materials are also different. Accordingly, in this embodiment, different first initialization voltages VREF1 may be configured for a light-emitting element with high light emission efficiency and a light-emitting element with low light emission efficiency, reducing the brightness-level of the light-emitting element with high light emission efficiency and maintaining the brightness-level of the light-emitting element with low light emission efficiency. In this case, displayed brightness-levels of the light-emitting elements in different colors have a stable range, maintaining the set ratio of colors, improving display effect, and avoiding the problem that a flicker is felt by human eyes.

In some embodiments, the at least one light-emitting element includes at least a red light-emitting element, a green light-emitting element, and a blue light-emitting element. In the second display stage Ti2, a first initialization voltage corresponding to the red light-emitting element is VREFR, a first initialization voltage corresponding to the green light-emitting element is VREFG, and a first initialization voltage corresponding to the blue light-emitting element is VREFB. |VREFG|>|VREFR|>|VREFB|. In this embodiment, the red light-emitting element, the green light-emitting element, and the blue light-emitting element may be provided. It is known that a light emission material of the blue light-emitting element has the lowest low light emission efficiency, a light emission material of the red light-emitting element has the second lowest low light emission efficiency, and a light emission material of the green light-emitting element has the highest low light emission efficiency. when the brightness-level of a light-emitting element in each color is suppressed by the same first initialization voltage VREF1, the blue light-emitting element is suppressed the most. In order to further avoid the occurrence of a color cast, this embodiment reduces the suppression of the display brightness-level of the blue light-emitting element through the first initialization voltage VREFB with a relatively small absolute value. Similarly, the first initialization voltage VREFR of the red light-emitting element has a relatively small absolute value, leading to a relatively weak suppression effect on display brightness-level. The first initialization voltage VREFG of the green light-emitting element has a relatively large absolute, leading to a relatively strong suppression effect on display brightness-level. In general, it is controlled that |VREFG|>|VREFR|>|VREFB|. Therefore, the display brightness-level of a light-emitting element in each color is suppressed to a similar degree, reducing the effect on the red light-emitting element and the blue light-emitting element in a reset process of the first node N1, making an RGB ratio relatively stable, and further alleviating the problem of a color cast.

Figure 16:
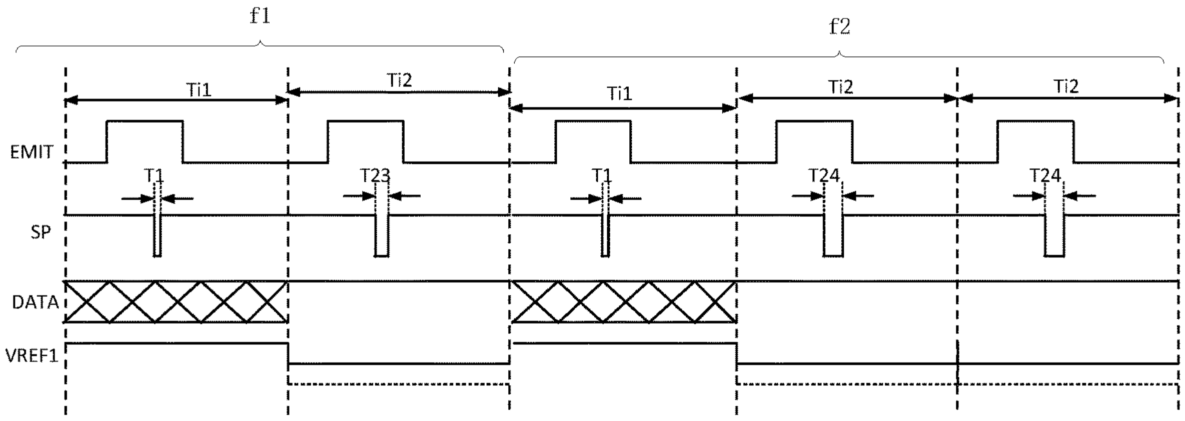
FIG. 16 is another drive timing diagram of a display panel according to an embodiment of the present disclosure.

FIG. 16 is another drive timing diagram of a display panel according to an embodiment of the present disclosure. In some embodiments, when a drive frequency of the at least one pixel circuit is a first frequency f1, the total effective-pulse duration of the first scan control signal in the second display stage Ti2 is T23. When the drive frequency of the at least one pixel circuit is a second frequency f2, the total effective-pulse duration of the first scan control signal in the second display stage Ti2 is T24. f1>f2. T23<T24.

When the frequency is changed by using a frame insertion method, a lower frequency indicates the longer time the at least one light-emitting element maintains the display brightness-level of the current data signal D1. When the refresh frequency of the display panel is set to the first frequency f1, the total effective-pulse duration of the first scan control signal SP in the second display stage Ti2 is controlled as T23. When the refresh frequency of the display panel is set to the second frequency f2, the total effective-pulse duration of the first scan control signal SP in the second display stage Ti2 is controlled as T24. when f1>f2, it indicates that the brightness-level maintaining time of the at least one light-emitting element is longer in the case of the second frequency f2. This embodiment may control that T23<T24, effectively balancing the display brightness-level of the at least one light-emitting element in the case of different refresh frequencies. In this case, when the frequency of the display panel is switched, for example, when the first frequency f1 is switched to the second frequency f2, human eyes are not easy to feel the change in the display brightness-level so that the problem of a color cast not easily occurs.

In some embodiments, when the display brightness-level of the at least one light-emitting element is first brightness-level L1, the total effective-pulse duration of the first scan control signal in the second display stage is T25. When the display brightness-level of the at least one light-emitting element is second brightness-level L2, the total effective-pulse duration of the first scan control signal in the second display stage is T26. L1>L2. T25<T26.

In general, the displayed brightness-level of the display panel may refer to the greyscale brightness-level. It is to be noted that the greyscale brightness-level is up to the display brightness-level of a display device. For the greyscale, there are 256 greyscale levels, from greyscale level 0 to greyscale level 255. The display brightness-level is greyscale under the greyscale level of 255. The brightness-level may be adjusted manually by a user. For example, for a terminal device like a mobile phone, the display brightness-level may be adjusted through sliding a control of "brightness-level adjustment bar". The range of the display brightness-level may be set through a driver chip of the display. The displayed brightness-level of the display panel is expressed by the formular: 1v=1v(max)×(grey/255)/\gamma, in which, "gamma" denotes a physical property of the display and is a fixed constant, "1v (max)" denotes the brightness-level, and "grey" denotes a greyscale value of a current displayed image. In an example, in the case where the display brightness-level is in the range of 2 nit to 500 nit, when the current greyscale level is 16, the greyscale brightness-level is ranged from 0.09 nit to 1 nit. As shown in Table 2, Table 2 is a table of correspondence between displayed brightness-level changing amounts and display brightness-levels under low greyscale. In Table 2, greyscale level of 16 is selected as the low greyscale. A displayed brightness-level change amount refers to a brightness-level change percentage of the display during a frequency switch. It can be seen that the higher the display brightness-level, the smaller the displayed brightness-level change amount of the display panel; and the lower the display brightness-level, the larger the displayed brightness-level change amount of the display panel. Accordingly, in this embodiment, when the display brightness-level of the at least one light-emitting element is the first brightness-level L1, the total effective-pulse duration of the first scan control signal SP in the second display stage Ti2 may be set to T25. When the display brightness-level of the at least one light-emitting element is the second brightness-level L2, the total effective-pulse duration of the first scan control signal SP in the second display stage Ti2 may be set to T26. When L1>L2, it is controlled that T25<T26 to further reduce the display brightness-level change of the display panel during the frequency switch and avoid the problem that a flicker is felt by human eyes.

TABLE 2

A table of correspondence between displayed brightness-level changing amounts and display brightness-levels under low greyscale

| | | | | |
|---|---|---|---|---|
| Display brightness-level | 500 nit | 100 nit | 50 nit | 2 nit |
| Greyscale brightness-level | 1 nit | 0.2 nit | 0.1 nit | 0.09 nit |
| Displayed brightness-level changing amount | 0.3% | 3% | 6% | 40% |

With continued reference to FIG. 14, in some embodiments, the display panel may further include a second initialization module 16 and a storage module 17. The second initialization module 16 is configured to be connected to a second initialization voltage VREF2 and the control terminal of the drive module 11. The storage module 17 is connected between the control terminal of the drive module 11 and the first power signal PVDD. The control terminal of the data write module 14 is configured to receive the second scan control signal SP2. A control terminal of the second initialization module 16 is connected to a third scan control signal SN1. A control terminal of the threshold compensation module 15 is connected to a fourth scan control signal SN2. In the first display stage Ti1, the first scan control signal SP controls the first initialization module 12 to be turned on, the second scan control signal SP2 controls the data write module 14 to be turned on, the third scan control signal SN1 controls the second initialization module 16 to be turned on, and the fourth scan control signal SN2 controls the threshold compensation module 15 to be turned on. In the second display stage Ti2, the first scan control signal SP controls the first initialization module 12 to be turned on, and the second scan control signal SP2 controls the data write module 14 to be turned on.

Figure 17:
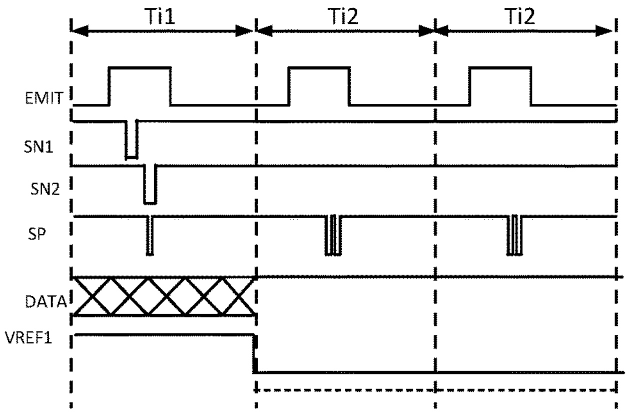
FIG. 17 is another drive timing diagram of a display panel according to an embodiment of the present disclosure.
Figure 18:
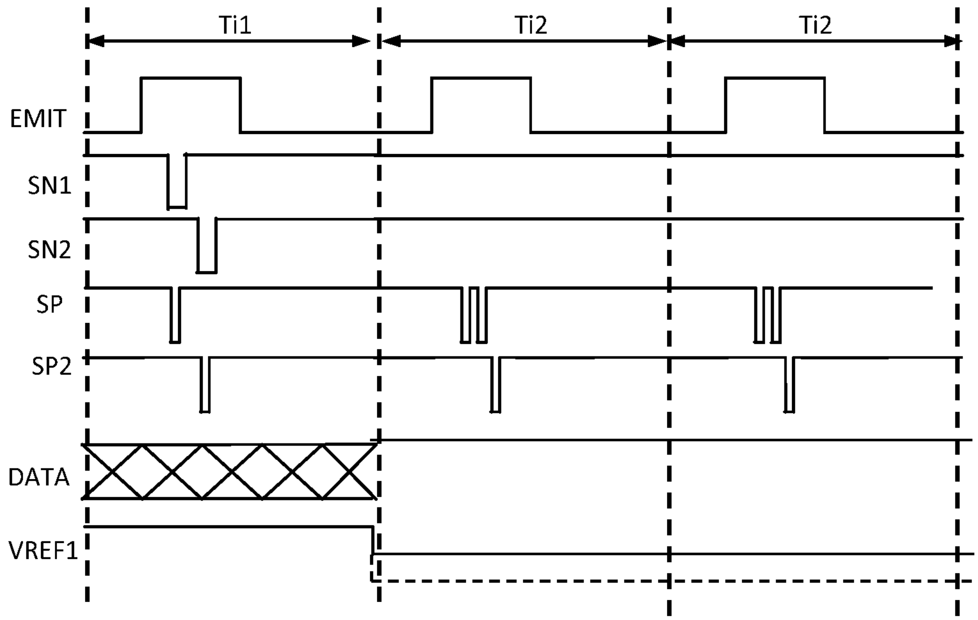
FIG. 18 is another drive timing diagram of a display panel according to an embodiment of the present disclosure.

As shown in FIG. 13, in this embodiment, the first scan control signal and the second scan control signal may be the same signal, i.e., the first scan control signal SP. The timing diagram in this case may be shown in FIG. 17. FIG. 17 is another drive timing diagram of a display panel according to an embodiment of the present disclosure. In the first display stage Ti1, the first scan control signal SP controls the first initialization module 12 and the data write module 14 to be turned on, the third scan control signal SN1 controls the second initialization module 16 to be turned on, and the fourth scan control signal SN2 controls the threshold compensation module 15 to be turned on. In the second display stage Ti2, the first scan control signal SP controls the first initialization module 12 and the data write module 14 to be turned on, and the second initialization module 16 and the threshold compensation module 15 are no longer turned on. To reset the first node N1 and the second node N2 separately, in this embodiment, the turning-on of the first initialization module 12 is controlled by the first scan control signal SP and the turning-on of the data write module 14 is controlled by the second scan control signal SP2. As shown in FIG. 18, FIG. 18 is another drive timing diagram of a display panel according to an embodiment of the present disclosure. In the first display stage Ti1, the first scan control signal SP controls the first initialization module 12 to be turned on, the second scan control signal SP2 controls the data write module 14 to be turned on, the third scan control signal SN1 controls the second initialization module 16 to be turned on, and the fourth scan control signal SN2 controls the threshold compensation module 15 to be turned on. In the second display stage Ti2, the first scan control signal SP controls the first initialization module 12 to be turned on, and the second scan control signal SP2 controls the data write module 14 to be turned on. As shown in FIG. 18, when the light-emitting element, that is, the first node N1, needs to be reset, the reset may be performed through the first scan control signal SP. Additionally, the reset time in the second display stage Ti2 is increased, enhancing the reset effect for the light-emitting element and effectively avoiding the brightness-level of each sub-pixel from exceeding a reasonable range. Moreover, when the second node N2 is reset, a reset duration of the second node N2 in the second display stage Ti2 is smaller than a reset duration of the first node N1, preventing a current from flowing back from the second node N2 into the first power signal PVDD in a reset process of the second node N2 and causing a waste of electricity.

Figure 19:
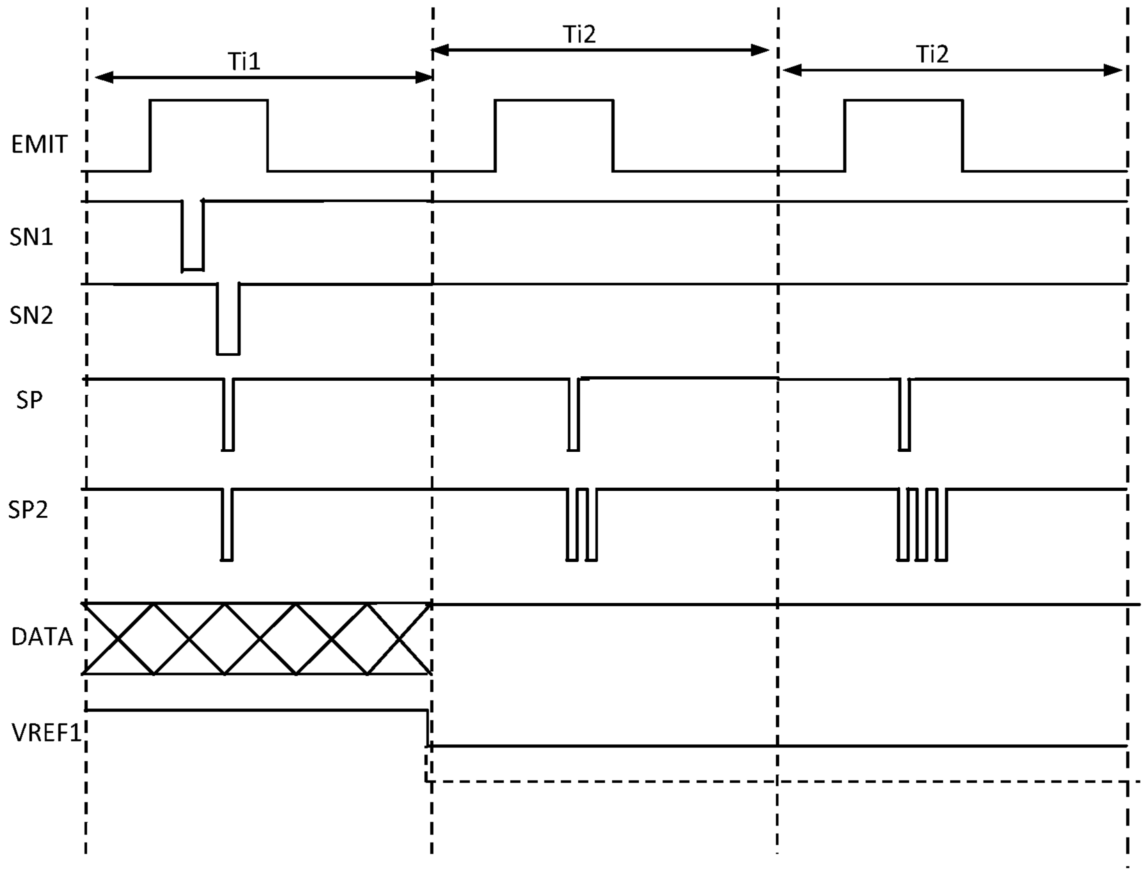
FIG. 19 is another schematic diagram of a pixel circuit according to an embodiment of the present disclosure.

In some embodiments, with continued reference to FIG. 18, when the turning-on of the first initialization module 12 is controlled through the first scan control signal SP and the turning-on of the data write module 14 is controlled through the second scan control signal SP2, an effective pulse of the first scan control signal SP partially overlaps an effective pulse of the third scan control signal SN1, and an effective pulse of the second scan control signal SP2 partially overlaps an effective pulse of the fourth scan control signal SN2. In another example, as shown in FIG. 19, FIG. 19 is another drive timing diagram of a display panel according to an embodiment of the present disclosure. The effective pulse of the first scan control signal SP partially overlaps the effective pulse of the fourth scan control signal SN2. The effective pulse of the second scan control signal SP2 partially overlaps the effective pulse of the fourth scan control signal SN2.

It is to be noted that the width of the effective pulse of the first scan control signal SP and the width of the effective pulse of the second scan control signal SP2 are smaller than the width of the effective pulse of the third scan control signal SN1 and the width of the effective pulse of the fourth scan control signal SN2 to improve the reset control flexibility of the first scan control signal SP and the second scan control signal SP2. For example, the width of the effective pulse of the third scan control signal SN1 and the width of the effective pulse of the fourth scan control signal SN2 are at least 4 pieces of row time. Each piece of row time is the scan time of sub-pixels in each row. The scan time of sub-pixels in each row=effective-frame time/total number of rows. In this case, the width of the effective pulse of the first scan control signal SP and the width of the effective pulse of the second scan control signal SP2 are at least 2 pieces of row time. Then the width of the effective pulse of the third scan control signal SN1 and the width of the effective pulse of the fourth scan control signal SN2 are 4 pieces of row time, 8 pieces of row time, 12 pieces of the row time, and the like. The first scan control signal SP and the second scan control signal SP2 may implement 2 pieces of row time, 4 pieces of row time, 6 pieces of row time, and the like, enhancing the accuracy of the first scan control signal SP controlling the reset duration of the at least one light-emitting element and improving the accuracy of controlling the display brightness-level of each pixel.

With continued reference to FIGS. 13 and 14, in some embodiments, the storage module 17 includes a first capacitor C1. The light emission control module 13 includes a first transistor M1 and a sixth transistor M6. The data write module 14 includes a second transistor M2. The drive module 11 includes a third transistor M3. The threshold compensation module 15 includes a fourth transistor M4. The first initialization module 12 includes a seventh transistor M7. The second initialization module 16 includes a fifth transistor M5. A control terminal of the third transistor M3 is connected to a second terminal of the fifth transistor M5 and a first terminal of the fourth transistor M4 separately. A first terminal of the third transistor M3 is connected to a second terminal of the first transistor M1. A first terminal of the first transistor M1 is connected to the first power signal PVDD. A second terminal of the third transistor M3 is connected to a second terminal of the fourth transistor M4 and a first terminal of the sixth transistor separately M6. A second terminal of the sixth transistor M6 is connected to an anode of a respective one of the at least one light-emitting element. A first terminal of the fifth transistor M5 is connected to the second initialization voltage VREF2. A first terminal of the second transistor M2 is connected to the data signal VREFTA. A second terminal of the second transistor M2 is connected to the first terminal of the third transistor M3. A first terminal of the seventh transistor M7 is connected to the first initialization voltage VREF1. A second terminal of the seventh transistor M7 is connected to the anode of the respective one of the at least one light-emitting element. The first transistor M1 and a control terminal of the sixth transistor M6 are configured to receive the light emission control signal EMIT. A control terminal of the fifth transistor M5 is configured to receive the third scan control signal SN1. A control terminal of the seventh transistor M7 is configured to receive the first scan control signal SP. A control terminal of the fourth transistor M4 is configured to receive the fourth scan control signal SN2. A control terminal of the second transistor M2 is configured to receive the second scan control signal SP2.

In the first display stage Ti1, the first scan control signal SP, the second scan control signal SP2, the third scan control signal SN1, and the fourth scan control signal SN2 are configured to implement driving as follows: in an initialization sub-stage, the fifth transistor M5 and the seventh transistor M7 are turned on while the first transistor M1, the second transistor M2, the fourth transistor M4, the third transistor M3, and the sixth transistor M6 are turned off; in a data write stage, the second transistor M2, the third transistor M3, and the fourth transistor M4 are turned on while the first transistor M1, the fifth transistor M5, the sixth transistor M6, and the seventh transistor M7 are turned off; and in a light emission stage, the first transistor M1, the third transistor M3, and the sixth transistor M6 are turned on while the second transistor M2, the fourth transistor M4, the fifth transistor M5, and the seventh transistor M7 are turned off. In the second display stage Ti2, in a period when the first transistor M1 and the sixth transistor M6 are turned off, the second transistor M2 and the seventh transistor M7 are turned off simultaneously or successively to reset the first node N1 of the ineffective frame and the second node N2 of the ineffective frame. In a period when the first transistor M1 and the sixth transistor M6 are turned on, the third transistor M3 is turned on while the second transistor M2, the fourth transistor M4, the fifth transistor M5, and the seventh transistor M7 are turned off.

With continued reference to FIGS. 13 and 14, in some embodiments, the first transistor M1, the second transistor M2, the third transistor M3, the fourth transistor M4, the fifth transistor M5, the sixth transistor M6, and the seventh transistor M7 are each a P-type transistor. In this case, the effective pulse of the first scan control signal SP, the effective pulse of the second scan control signal SP2, the effective pulse of the third scan control signal SN1, and the effective pulse of the fourth scan control signal SN2 are each a negative value. Moreover, the effective pulse of the first scan control signal SP, the effective pulse of the second scan control signal SP2, and the effective pulse of the fourth scan control signal SN2 may have the same timing. In this case, a signal may be multiplexed between the first scan control signal SP, the second scan control signal SP2, and the fourth scan control signal SN2, reducing the number of provided drive signals and reducing the drive load of the driver chip.

Figure 20:
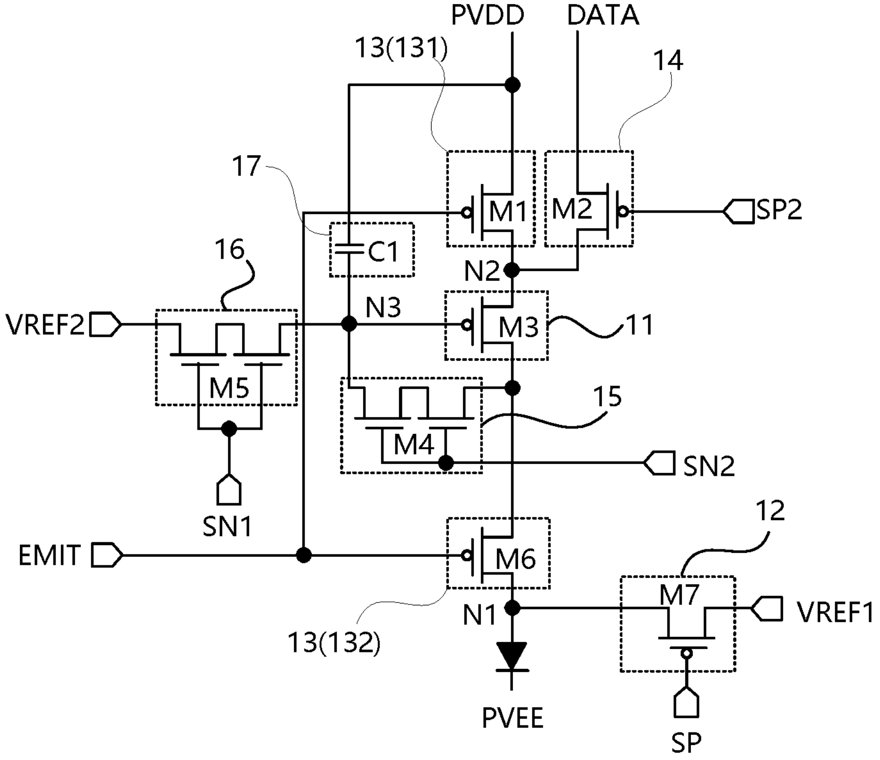
FIG. 20 is another drive timing diagram of a display panel according to an embodiment of the present disclosure.
Figure 21:
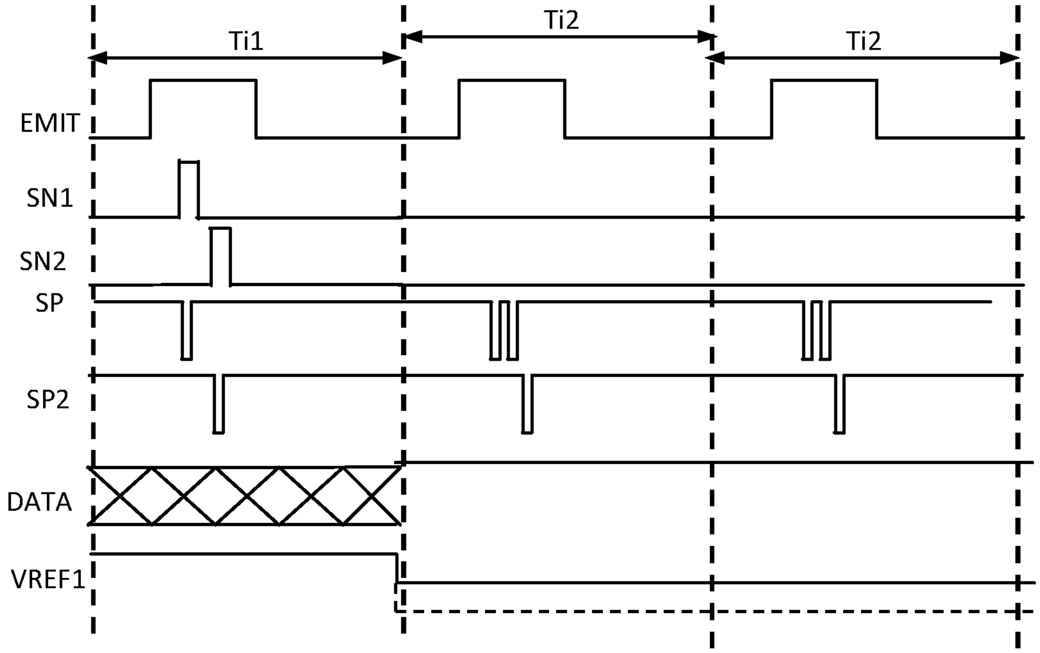
FIG. 21 is another drive timing diagram of a display panel according to an embodiment of the present disclosure.

FIG. 19 is another schematic diagram of a pixel circuit according to an embodiment of the present disclosure. In some embodiments, the first transistor M1, the second transistor M2, the third transistor M3, the sixth transistor M6, and the seventh transistor M7 are each a P-type transistor. The fourth transistor M4 and the fifth transistor M5 are each an N-type transistor. As shown in FIGS. 20 and 21, FIG. 20 is another drive timing diagram of a display panel according to an embodiment of the present disclosure. FIG. 21 is another drive timing diagram of a display panel according to an embodiment of the present disclosure. In the first display stage Ti1, the direction of the effective pulse of the first scan control signal SP is opposite to the direction of the effective pulse of the fourth scan control signal SN2 or the direction of the effective pulse of the third scan control signal SN1. Moreover, the period of the effective pulse of the first scan control signal SP at least partially overlaps the period of the effective pulse of the fourth scan control signal SN2 or the period of the effective pulse of the third scan control signal SN1. The direction of the effective pulse of the second scan control signal SP2 is opposite to the direction of the effective pulse of the fourth scan control signal SN2. Moreover, the period of the effective pulse of the second scan control signal SP2 is located within the period of the effective pulse of the fourth scan control signal SN2. When the first node N1 and the second node are reset at different times, four scan control signals are needed. On this basis, the display circuit in this embodiment is provided through indium gallium zinc oxide (IGZO) processing. An active layer of the fourth transistor M4 and an active layer of the fifth transistor M5 are indium tin oxide. An active layer of the first transistor M1, an active layer of the second transistor M2, an active layer of the third transistor M3, an active layer of the sixth transistor M6, and an active layer of the seventh transistor M7 are low-temperature polysilicon. Low-temperature polysilicon has the advantages of high electron mobility, low power consumption, high opening ratio, high resolution, and high brightness-level. Indium tin oxide has the advantages of high transmittance and low manufacturing cost, facilitating the implementation of a transparent display and adapting to trends of full transparency and flexible folding for display terminals in the future.

Figure 22:
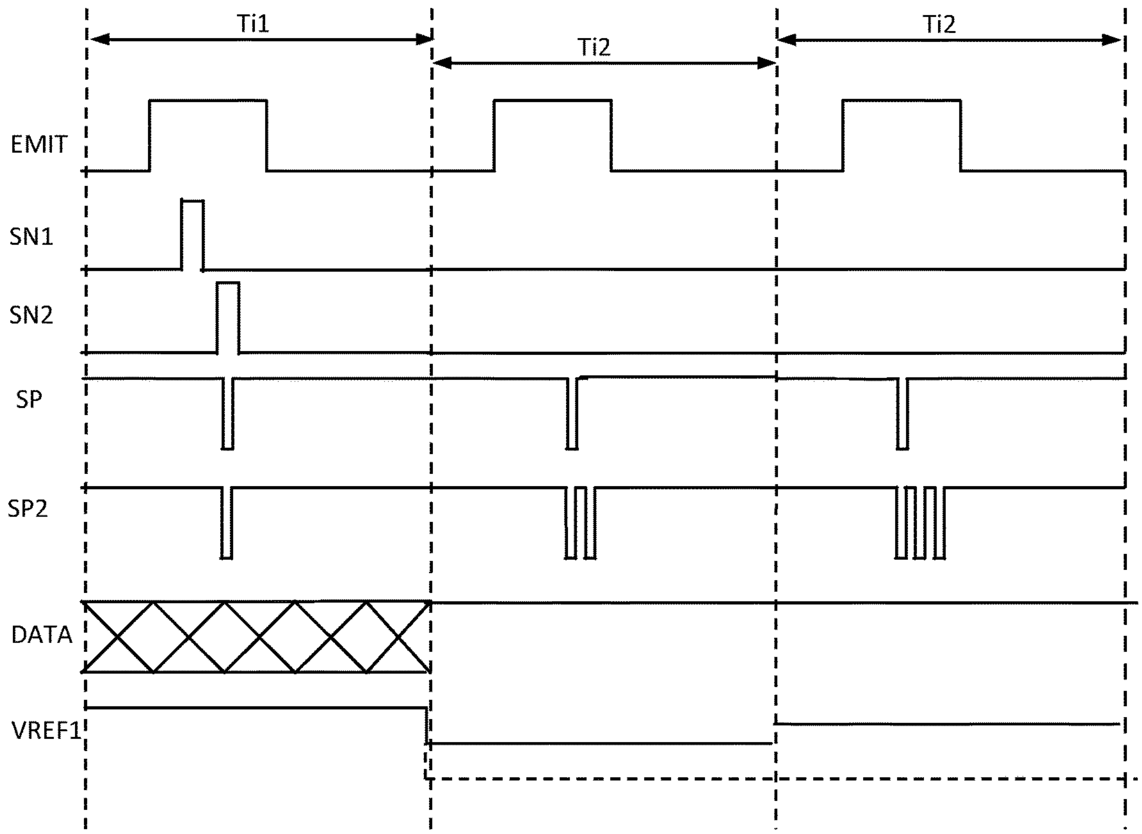
FIG. 22 is another drive timing diagram of a display panel according to an embodiment of the present disclosure.

It is to be noted that each first display stage Ti1 (effective frame) and each second display stage Ti2 (ineffective frame) include a plurality of display sub-stages (pulses), e.g., two display sub-stages. In an example, as shown in FIG. 22, FIG. 22 is another drive timing diagram of a display panel according to an embodiment of the present disclosure. Each effective frame and each ineffective frame include three display sub-stages. The time of each display sub-stage is the same. Each display sub-stage includes one effective pulse of an EMIT signal. Moreover, in each first display stage Ti1 and each second display stage Ti2, the reset of the first node N1 and the reset of the second node N2 are performed in a first display sub-stage and may not be performed in the remaining display sub-stage.

Figure 23:
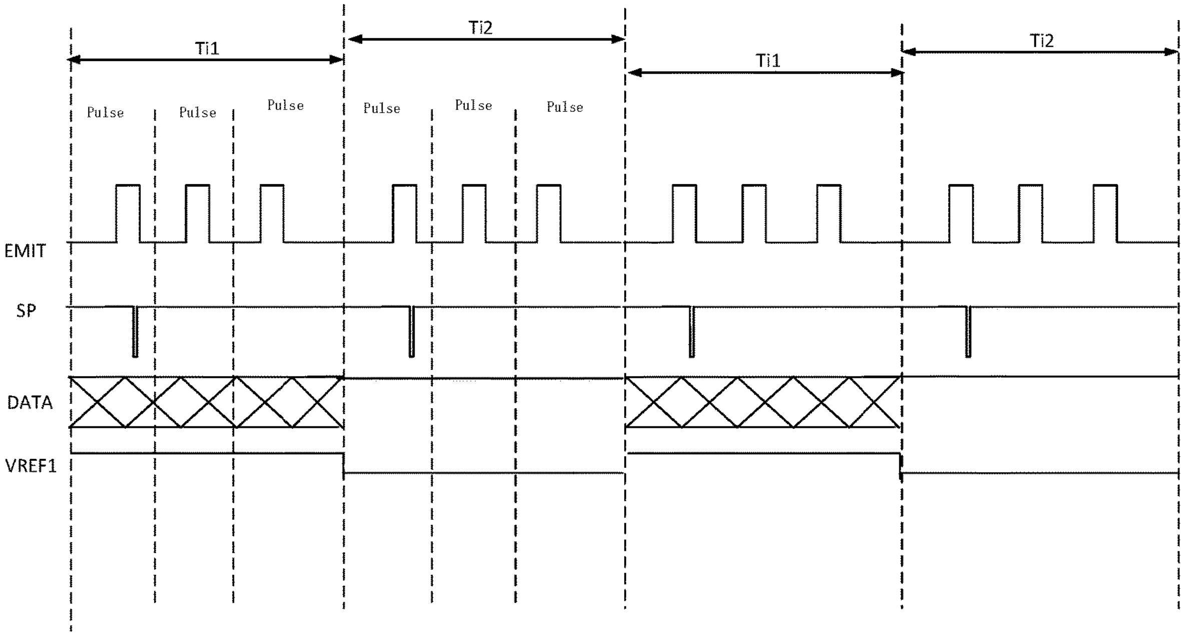
FIG. 23 is another drive timing diagram of a display panel according to an embodiment of the present disclosure.
Figure 24:
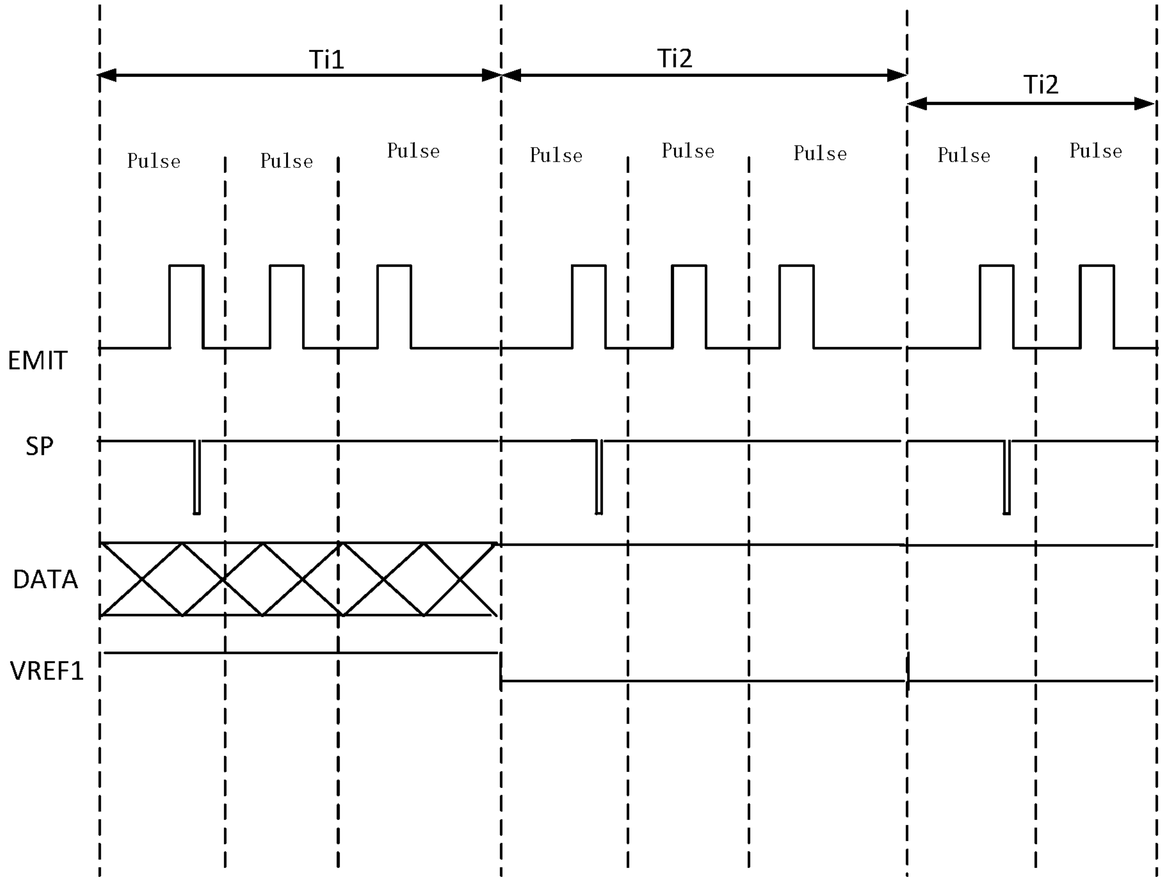
FIG. 24 is another drive timing diagram of a display panel according to an embodiment of the present disclosure.

On the basis of the preceding embodiment, the effective frame and the ineffective frame may include different numbers of display sub-stages (pulses). As shown in FIG. 23, FIG. 23 is another drive timing diagram of a display panel according to an embodiment of the present disclosure. A first display stage Ti1 is an effective frame. A second display stage Ti2 is not an ineffective frame. Such a frequency-switching method may be referred to as a pulse insertion method. That is, when a frequency is reduced on the basis of a fundamental frequency, the frequency may be reduced by integer multiples or non-integer multiples. As shown in FIG. 23, the refresh frequency is between 120 Hz and 60 Hz, improving the switching flexibility of the refresh frequency. In another example, as shown in FIG. 24, FIG. 24 is another drive timing diagram of a display panel according to an embodiment of the present disclosure. The display panel includes two second display stages Ti2, with the refresh frequency between 60 Hz and 40 Hz. In this case, the first display stage Ti1 is an effective frame and includes three display sub-stages. The first second display stage Ti2 forms one ineffective frame and includes three display sub-stages. The second display stage Ti2 includes two display sub-stages. In some embodiments, the reset of the first node N1 and the reset of the second node N2 may be performed in a first display sub-stage in each second display stage Ti2. This embodiment can effectively improve the modification range of the refresh rate of the display panel, improve the accuracy of brightness-level modification, further avoid the occurrence of a color cast, and improve the effect of image display.

Figure 25:
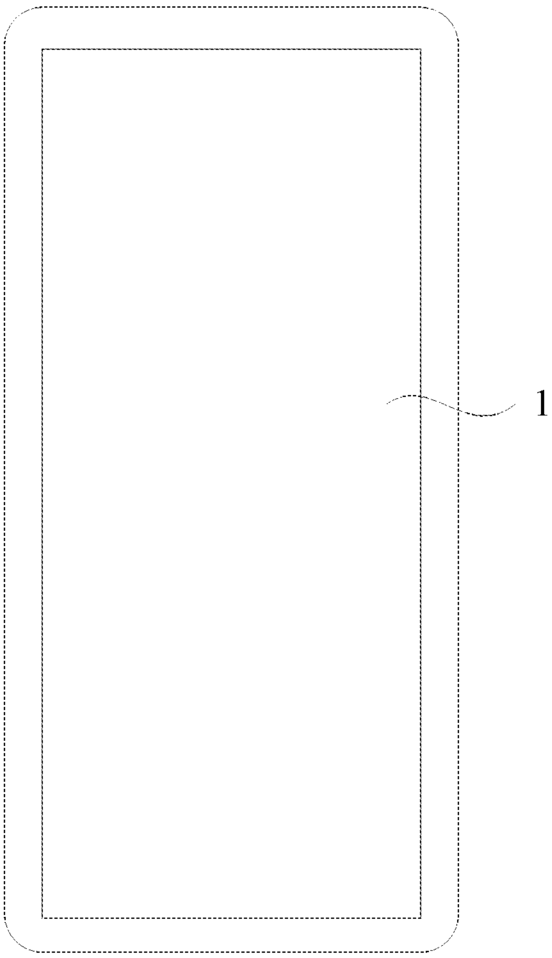
FIG. 25 is a schematic diagram of a display device according to an embodiment of the present disclosure.

Based on the same concept, embodiments of the present disclosure further provide a display device. FIG. 25 is a schematic diagram of a display device according to an embodiment of the present disclosure. As shown in FIG. 25, the display device in the embodiments of the present disclosure includes the display panel 1 in any embodiment of the present disclosure. The display device may be a mobile phone 200 as shown in FIG. 25, or may be a computer, a television, a smart wearable device or the like, which is not limited in the embodiment.

The display device provided in the embodiment of the present disclosure includes the technical features of the display panel provided in any embodiment of the present disclosure and has the beneficial effects of the corresponding features, which is not repeated herein.

What is claimed is:

1. A display panel, comprising at least one pixel circuit and at least one light-emitting element, wherein the at least one pixel circuit is configured to drive the at least one light-emitting element to emit light;

the at least one pixel circuit comprises a drive module and a first initialization module, the drive module comprises a drive transistor, the first initialization module comprises a first initialization transistor, the first initialization module is configured to supply a first initialization voltage to a first node, the first node is connected to a respective one of the at least one light-emitting element, the first initialization module comprises a first control terminal, and the first control terminal is configured to transmit the first initialization voltage to the first node in response to an effective pulse of a first scan control signal;

wherein a display period of the display panel comprises a first display stage and a second display stage, a data signal of the at least one pixel circuit is refreshed during the first display stage, and the data signal of the at least one pixel circuit is not refreshed during the second display stage; in the first display stage, a total effective-pulse duration of the first scan control signal is T1; and in the second display stage, the total effective-pulse duration of the first scan control signal is T2; wherein T1<T2;

wherein the first display stage comprises a first non-emitting stage and a first emitting stage in consecutive, a pulse of a light emission control signal is ineffective during the first non-emitting stage; and within the first display stage, a first time interval is set from an end time of a last effective pulse of the first scan control signal to an end time of the first non-emitting stage;

wherein the second display stage comprises a second non-emitting stage and a second emitting stage in consecutive, the pulse of the light emission control signal is ineffective during the second non-emitting stage; and within the second display stage, a second time interval is set from an end time of a last effective pulse of the first scan control signal to an end time of the second non-emitting stage; and wherein a duration of the first time interval is shorter than a duration of the second time interval.

2. The display panel according to claim 1, wherein in the first display stage, the first initialization voltage is V1; and in the second display stage, the first initialization voltage is V2; wherein (V1|<|V2|.

3. The display panel according to claim 2, wherein the at least one light-emitting element comprise a first color light-emitting element and a second color light-emitting element; and in the second display stage, a first initialization voltage of a respective one of the at least one pixel circuit corresponding to the first color light-emitting element is different from a first initialization voltage of a respective one of the at least one pixel circuit corresponding to the second color light-emitting element.

4. The display panel according to claim 3, wherein the at least one light-emitting element comprise at least a red light-emitting element, a green light-emitting element, and a blue light-emitting element; and in the second display stage, a first initialization voltage corresponding to the red light-emitting element is VREFR, a first initialization voltage corresponding to the green light-emitting element is VREFG, and a first initialization voltage corresponding to the blue light-emitting element is VREFB, wherein |VREFG|>|VREFR|>|VREFB|.

5. The display panel according to claim 1, wherein the first display stage and the second display stage each comprise one effective pulse of the first scan control signal; and a width of an effective pulse of the first scan control signal in the second display stage is greater than a width of an effective pulse of the first scan control signal in the first display stage.

6. The display panel according to claim 1, wherein the second display stage comprises at least two effective pulses of the first scan control signal.

7. The display panel according to claim 1, wherein the display period of the display panel comprises the first display stage and a plurality of second display stages; and the total effective-pulse duration of the first scan control signal in each of the plurality of second display stages is same.

8. The display panel according to claim 1, wherein the display period of the display panel comprises the first display stage and a plurality of second display stages; and total effective-pulse durations of the first scan control signal in at least two of the plurality of second display stages are different.

9. The display panel according to claim 8, wherein in an i-th second display stage of the plurality of second display stages, the first initialization voltage is V21, and the total effective-pulse duration of the first scan control signal is T21; in an (i+1)-th second display stage of the plurality of second display stages, the first initialization voltage is V22, and the total effective-pulse duration of the first scan control signal is T22; |V21|>|V22|; and T21<T22; wherein 1≤i≤N−1, i is an integer, and N is a total number of the plurality of second display stages.

10. The display panel according to claim 1, further comprising a light emission control module, wherein the light emission control module comprises light emission control transistors;

the light emission control module is configured to control a drive current to be transmitted to a respective one of the at least one light-emitting element in response to the light emission control signal; and in the first display stage and the second display stage, a period of an effective pulse of the first scan control signal is located within a period of an ineffective pulse of the light emission control signal.

11. The display panel according to claim 10, further comprising a data write module and a threshold compensation module, wherein the data write module comprises a data write transistor, and the threshold compensation module comprises a threshold compensation transistor;

the data write module is configured to supply the data signal to a first terminal of the drive module, and the threshold compensation module is connected to a control terminal of the drive module and a second terminal of the drive module; and the data signal in the first display stage is D1, and the data signal in the second display stage is D2, wherein |D1|<|D2|.

12. The display panel according to claim 11, wherein a control terminal of the data write module is configured to receive the first scan control signal; and in the first display stage and the second display stage, the first scan control signal is used to control the data write module and the first initialization module to be turned on simultaneously.

13. The display panel according to claim 11, wherein a control terminal of the data write module is configured to receive a second scan control signal; and in the first display stage and the second display stage, the second scan control signal is used to control the data write module to be turned on, and the first scan control signal is used to control the first initialization module to be turned on; and in the second display stage, the total effective-pulse duration of the first scan control signal is longer than a total effective-pulse duration of the second scan control signal.

14. The display panel according to claim 11, further comprising a second initialization module and a storage module, wherein the second initialization module comprises a second initialization transistor, and the storage module comprises a storage capacitor;

the second initialization module is configured to be connected to a second initialization voltage and the control terminal of the drive module, and the storage module is connected between the control terminal of the drive module and a first power signal;

a control terminal of the data write module is configured to receive a second scan control signal, a control terminal of the second initialization module is connected to a third scan control signal, and a control terminal of the threshold compensation module is connected to a fourth scan control signal;

in the first display stage, the first scan control signal is used to control the first initialization module to be turned on, the second scan control signal is used to control the data write module to be turned on, the third scan control signal is used to control the second initialization module to be turned on, and the fourth scan control signal is used to control the threshold compensation module to be turned on; and in the second display stage, the first scan control signal is used to control the first initialization module to be turned on, and the second scan control signal is used to control the data write module to be turned on.

15. The display panel according to claim 14, wherein the drive transistor is a third transistor, the first initialization transistor is a seventh transistor, the light emission control transistors are a first transistor and a sixth transistor, the data write transistor is a second transistor, the threshold compensation transistor is a fourth transistor, the second initialization transistor is a fifth transistor, and the storage capacitor is a first capacitor;

a control terminal of the third transistor is connected to a second terminal of the fifth transistor and a first terminal of the fourth transistor separately, a first terminal of the third transistor is connected to a second terminal of the first transistor, a first terminal of the first transistor is connected to the first power signal, a second terminal of the third transistor is connected to a second terminal of the fourth transistor and a first terminal of the sixth transistor separately; and a second terminal of the sixth transistor is connected to an anode of a respective one of the at least one light-emitting element;

a first terminal of the fifth transistor is connected to the second initialization voltage, a first terminal of the second transistor is connected to the data signal, a second terminal of the second transistor is connected to the first terminal of the third transistor, a first terminal of the seventh transistor is connected to the first initialization voltage, and a second terminal of the seventh transistor is connected to the anode of the respective one of the at least one light-emitting element; and the first transistor and a control terminal of the sixth transistor are connected to the light emission control signal, a control terminal of the fifth transistor is connected to the third scan control signal, a control terminal of the seventh transistor is connected to the first scan control signal, a control terminal of the fourth transistor is connected to the fourth scan control signal, and a control terminal of the second transistor is connected to the second scan control signal.

16. The display panel according to claim 15, wherein the first transistor, the second transistor, the third transistor, the fourth transistor, the fifth transistor, the sixth transistor, and the seventh transistor are each a P-type transistor;

or, the first transistor, the second transistor, the third transistor, the sixth transistor, and the seventh transistor are each a P-type transistor; and the fourth transistor and the fifth transistor are each an N-type transistor.

17. The display panel according to claim 1, wherein when a drive frequency of the at least one pixel circuit is a first frequency f1, the total effective-pulse duration of the first scan control signal in the second display stage is T23; and when the drive frequency of the at least one pixel circuit is a second frequency f2, the total effective-pulse duration of the first scan control signal in the second display stage is T24;

wherein f1>f2, and T23<T24.

18. The display panel according to claim 1, wherein when a display brightness-level of the at least one light-emitting element is first brightness-level L1, the total effective-pulse duration of the first scan control signal in the second display stage is T25; and when the display brightness-level of the at least one light-emitting element is second brightness-level L2, the total effective-pulse duration of the first scan control signal in the second display stage is T26; wherein L1>L2, and T25<T26.

19. A display device, comprising a display panel, wherein the display panel comprises at least one pixel circuit and at least one light-emitting element, wherein the at least one pixel circuit is configured to drive the at least one light-emitting element to emit light;

the at least one pixel circuit comprises a drive module and a first initialization module, the drive module comprises a drive transistor, the first initialization module comprises a first initialization transistor, the first initialization module is configured to supply a first initialization voltage to a first node, the first node is connected to a respective one of the at least one light-emitting element, the first initialization module comprises a first control terminal, and the first control terminal is configured to transmit the first initialization voltage to the first node in response to an effective pulse of a first scan control signal;

wherein a display period of the display panel comprises a first display stage and a second display stage, a data signal of the at least one pixel circuit is refreshed during the first display stage, and the data signal of the at least one pixel circuit is not refreshed during the second display stage; in the first display stage, a total effective-pulse duration of the first scan control signal is T1; and in the second display stage, the total effective-pulse duration of the first scan control signal is T2; wherein T1<T2;

wherein the first display stage comprises a first non-emitting stage and a first emitting stage in consecutive, a pulse of a light emission control signal is ineffective during the first non-emitting stage; and within the first display stage, a first time interval is set from an end time of a last effective pulse of the first scan control signal to an end time of the first non-emitting stage;

wherein the second display stage comprises a second non-emitting stage and a second emitting stage in consecutive, the pulse of the light emission control signal is ineffective during the second non-emitting stage; and within the second display stage, a second time interval is set from an end time of a last effective pulse of the first scan control signal to an end time of the second non-emitting stage; and wherein a duration of the first time interval is shorter than a duration of the second time interval.

* * * * *